United States Patent
Jaschek et al.

(10) Patent No.: US 7,324,990 B2
(45) Date of Patent: Jan. 29, 2008

(54) REAL TIME RELEVANCY DETERMINATION SYSTEM AND A METHOD FOR CALCULATING RELEVANCY OF REAL TIME INFORMATION

(75) Inventors: Boaz Jaschek, Ra'anana (IL); Danny Zach, Tel Aviv (IL); Michal Anvy, Tel Aviv (IL); Arik Kopelman, Hod Hasharon (IL)

(73) Assignee: The Relegence Corporation, New York, NY (US)

( * ) Notice: Subject to any disclaimer, the term of this patent is extended or adjusted under 35 U.S.C. 154(b) by 893 days.

(21) Appl. No.: 10/071,155

(22) Filed: Feb. 7, 2002

(65) Prior Publication Data

US 2003/0149727 A1 Aug. 7, 2003

(51) Int. Cl.
*G06F 17/00* (2006.01)
(52) U.S. Cl. ............................... 707/5; 707/6; 707/100
(58) Field of Classification Search .................... 707/5, 707/6, 10, 100, 3, 4, 104.1, 102
See application file for complete search history.

(56) References Cited

U.S. PATENT DOCUMENTS

| | | | | |
|---|---|---|---|---|
| 5,317,647 | A | * | 5/1994 | Pagallo ...................... 382/161 |
| 5,715,446 | A | * | 2/1998 | Kinoshita et al. ............... 707/5 |
| 6,546,388 | B1 | * | 4/2003 | Edlund et al. .................. 707/5 |
| 6,845,374 | B1 | * | 1/2005 | Oliver et al. ................... 707/5 |
| 7,089,227 | B2 | * | 8/2006 | Abe et al. ....................... 707/3 |
| 2002/0138475 | A1 | * | 9/2002 | Lee ................................. 707/3 |
| 2003/0208482 | A1 | * | 11/2003 | Kim et al. ...................... 707/3 |
| 2004/0098399 | A1 | * | 5/2004 | Risberg et al. ............. 707/100 |

* cited by examiner

*Primary Examiner*—Greta L Robinson
(74) *Attorney, Agent, or Firm*—Seth D. Levy; Davis Wright Tremaine LLP

(57) ABSTRACT

A system and method for determining relevancy of real time received terms, the method includes the steps of: determining relevancy keywords; extracting real time terms from currently received information streams; updating current reception patterns of relevancy keywords in response to a comparison between the extracted real time terms and the relevancy keywords; and determining a relevancy of relevancy keywords in response to a comparison between current reception patterns and reference reception patterns.

96 Claims, 13 Drawing Sheets

ALERT MODULE

SEARCH ENGINE

REAL TIME RELEVANCY DETERMINATION SYSTEM AND A METHOD FOR CALCULATING RELEVANCY OF REAL TIME INFORMATION

RELATED APPLICATIONS

U.S. patent application Ser. No. 09/481,206 filed 11 Jan. 2000, U.S. patent application Ser. No. 09/655,185 filed 5 Sep. 2000, and U.S. patent application Ser. No. 09/654,801 filed 5 Sep. 2000.

FIELD OF THE INVENTION

The present invention generally relates to real time relevancy systems and a method for calculating the relevancy value of real time information.

BACKGROUND OF THE INVENTION

At the beginning of the third Millennium, a client can receive a very large amount of information, such as real time information, from many information sources. Commonly, a client has a personal computer, a cellular phone, a laptop computer or another type of computerized device that is coupled to information sources over various networks, including cellular networks, cable networks, broadband networks and the like. Some of the said networks form a part of the Internet.

Various data processing schemes were offered for handling and managing the vast amount of information. Many prior art methods and systems allow for matching information to predefined queries.

There is a need to improve the systems and methods for processing real time information that is provided over data and media networks.

There is a need to provide systems and methods for processing real time information in response to the behavior patterns of data over these networks.

There is a need to provide an adjustable real time relevancy system and method that reflects both predefined criteria and the content of real time generated materials.

SUMMARY OF THE INVENTION

The invention provides a method for determining relevancy of real time received terms, the method includes the steps of: determining relevancy keywords; extracting real time terms from currently received information streams; updating current reception patterns of relevancy keywords in response to a comparison between the extracted real time terms and the relevancy keywords; and determining a relevancy of relevancy keywords in response to a comparison between current reception patterns and reference reception patterns.

The at least one relevancy keyword can be extracted from a client query, from a client alarm criteria and may include a single word, a single term, a combination of words and a combination of terms. The query terms, alert terms may be extracted and provided to a relevancy determination unit by an alert module and a search engine.

The method may also include a step of estimating flow patterns of the received information steams. The current reception patterns of relevancy keywords may be further responsive to the estimated flow patterns of the received information streams. The step of estimating flow patterns may include monitoring the reception of flow keywords, or any portion of the received information streams. Flow keywords may be predefined words but usually include commonly used words. The step of estimating the flow may also be done by other methods known in the art such as monitoring the bit rate of active media sources and the duration of transmission, but this is not necessarily so.

According to another aspect of the invention the flow estimation and the relevancy value is also responsive to the source of the information. Accordingly each extracted term may be evaluated in response to a predefined weight factor associated to the origin of the extracted term.

The information packets may comprise of content such as but not limited to text, audio, video, multimedia, and executable code streaming media.

The method may also include compensating for time differences resulting from a reception of information streams from distinct geographical locations.

The method may further include a step of compensating for time differences resulting from a reception of information streams relating to events that occur at distinct geographical locations.

The current reception patterns may reflect the reception of relevancy keywords during a test period or even during at least two test periods. The at least two test periods may at least partially overlap, but this in not necessarily so. Each test period of the at least two test periods is characterized by a corresponding current reception pattern. The corresponding current reception patterns are compared to the reference reception pattern. Conveniently, each comparison out of the at least two comparisons provides a comparison result and the determination of the relevancy value is responsive to a combination of the at least one comparison result. It is noted that the reference reception pattern reflects the reception of a relevancy keyword during a time period that is much longer than each of the test periods, but this is not necessarily so.

The step of determining a relevancy of relevancy keywords comprising attaching a relevancy level to relevancy keywords. The relevancy values are defined by relevancy value thresholds.

BRIEF DESCRIPTION OF THE DRAWINGS

The present disclosure will be understood and appreciated more fully from the following detailed description taken in conjunction with the drawings in which.

DETAILED DESCRIPTION OF THE PREFERRED EMBODIMENT

It should be noted that the particular terms and expressions employed and the particular structural and operational details disclosed in the detailed description and accompanying drawings are for illustrative purposes only and are not intended to in any way limit the scope of the invention as described in the appended claims.

It should be noted that the particular terms and expressions employed and the particular structural and operational details disclosed in the detailed description and accompanying drawings are for illustrative purposes only and are not intended to in any way limit the scope of the invention as described in the appended claims.

The Environment of the Relevancy Determination Unit

Figure 1A:
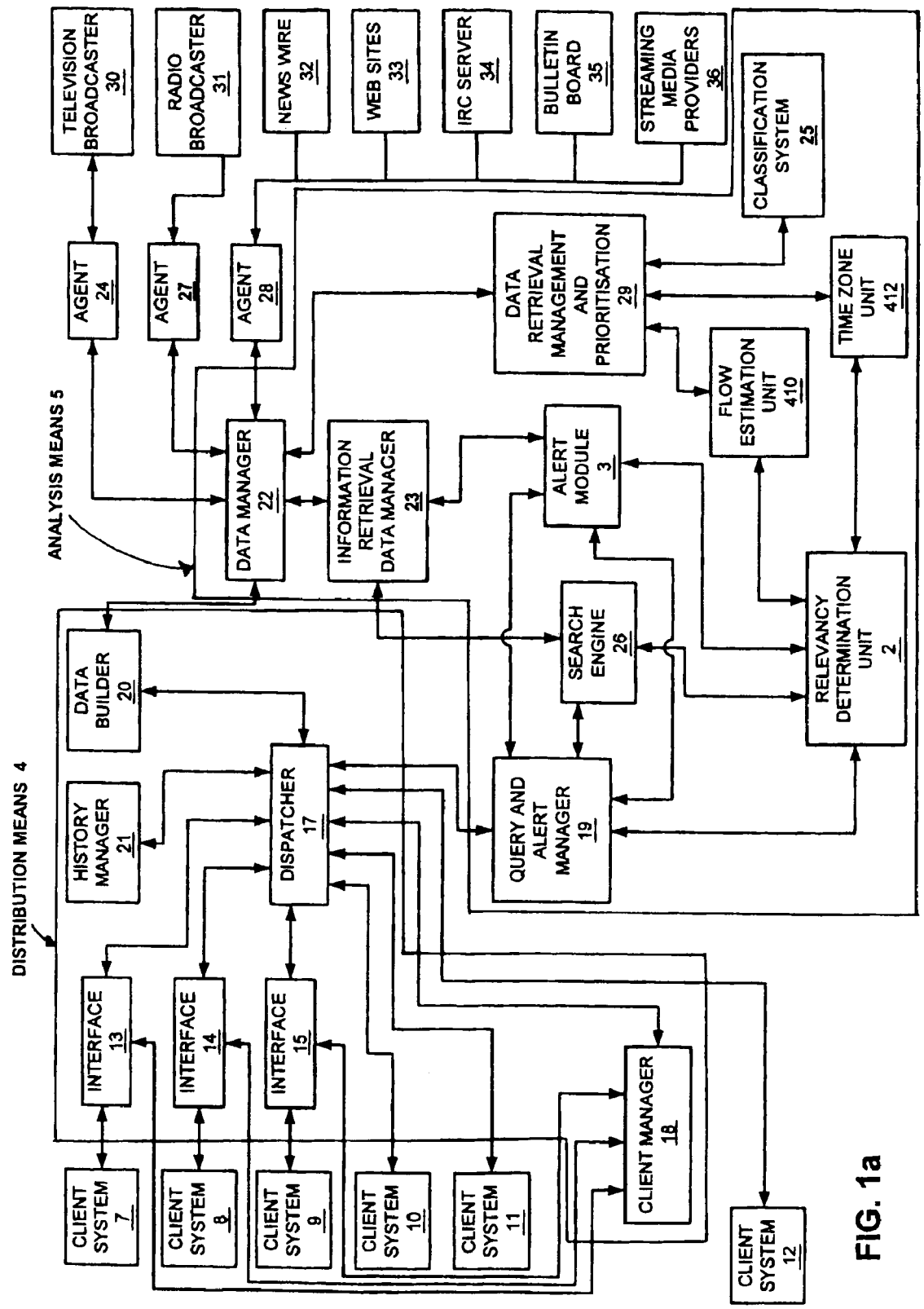
FIG. 1a is a simplified illustration of the environment in which the relevancy determination unit is operating, in accordance with a preferred embodiment of the present disclosure.

Referring to FIG. 1a describing system 1 in which relevancy determination unit 2 operates, according to a preferred embodiment of the invention. System 1 includes distribution means 4, analysis means 5, retrieval means 6, and a database of documents 3.

Client systems 7, 8, 9, 10, 11 and 12 provide client queries to system 1. Client systems are coupled to system 1 via a network and a plurality of interfaces, such as interfaces 13, 14 and 15. For convenience of explanation it is assumed that client system 7 is a personal computer system, client system 8 is a cellular phone, client system 9 is a PDA, client system 10 is a set top box coupled to a digital television, client system 11 is adapted to receive electronic mail. Accordingly, interfaces 13-15 are adapted to provide query results in various formats, according to various communication protocols, such as the TCP/IP protocol. For example, client system 8 can receive query results and alerts in WAP format. Usually, a client system receives a query result including of text, audio stream, and video stream. Such a query result often includes of a URL address, for allowing a client system to access desired information via a network such as the Internet.

It is assumed that a client system can provide a client query and/or can update an alert criterion. System 1 accordingly provides said client system with a query result and/or an alert.

Conveniently, distribution means 4 including of interfaces 13-15, client manager 18, dispatcher 17, history manager 21, query and alert manager 19 and data builder 20. Client manager 18 holds client profiles. A client profile can indicate which queries were provided by the client system, at least one format in which either a query result and/or an alert is to be sent to a client system, a client identifier ID, and a list of alert criteria. Client Manager 18 manages user profiles and provides queries or alert criteria to alert module 3 via query and alert manager 19. Each query/alert a criterion is associated with said client ID. Conveniently, client manager 19 holds a table for mapping alerts to client systems.

Distribution means 4 interfaces between clients and the analysis means 5. Dispatcher 17 and interfaces 13-15 are adapted to receive client queries and/or alert criteria from client systems 7-8, to update client profiles and send said client queries/alert criteria to analysis means 5. Query results and/or alerts are generated by analysis means 5 and dispatched to client systems by distribution means 4.

Dispatcher 17 receives from client manager updated alert criteria and/or client queries and provides them to query and alert manager 19. Dispatcher 17 receives alerts and query results and in association with client manager 18 determines to which client system to send said alert and/or query result and in what format. Said alert and/or query results are provided to one of interfaces 13-15 and to the appropriate client systems. Dispatcher 17 receives query results and alerts from analysis system 5 via query and alert manager 19. In response to a reception of an alert or a query result, dispatcher 17 in association with client manager 18 determine which information to include in a query result or alert to be sent to a client system. Accordingly, a content object request is sent to data builder 20.

Relevancy determination unit 2 is operable to determine the relevancy of multiple keywords in response to the reception of the keywords. The keywords can be either statically or dynamically selected. It is noted that the term "keyword" is used to describe, a single word, a single term, a combination of terms and a combination of words. According to some aspects of the invention the keywords may include (i) queries provided by clients, and/or (ii) queries terms, and/or (iii) alert criteria provided by clients, and/or (iv) alert terms, but this is not necessarily so.

Relevancy determination unit 2 can process incoming data streams from retrieval means 6 and process and filter them to provide real time terms that are matched against the keywords but can also rely on the filtering and processing mechanisms within search engine 26 and alert module 3. If, for example, a relevancy keyword is a client query the reception of a keyword is detected by search engine 26. It is noted that if the flow estimation is based upon the overall reception of keywords (i.e.—the floe estimation keywords are the relevancy keywords) then the flow estimation may be made by relevancy estimation unit 2 in conjunction with search engine 26 and alert module 3. It is noted that the relevancy determination unit 2 may be coupled to various agents, to client manager 19.

According to an aspect of the invention relevancy determination unit 2 is also operable to receive flow estimate information from flow estimating unit 410 and time zone information from time zone unit 412. Time zone estimation unit 412 and flow estimation unit 410 may be coupled to various agents, such as agents 24, 27 and 28, but this is not necessarily so.

Flow estimation unit 410 estimates the amount of incoming traffic or an amount of a predefined portion of the incoming traffic. The traffic estimate may reflect the amount of predefined flow estimation keywords that were received during a predefined time period. The flow estimation unit may have its own configurable filtering systems for extracting the predefined flow estimation keywords, but it can also receive such information from alert module 3 (when the predefined flow estimation keywords are also defined as alert terms) or from search engine 26 (when the predefined flow estimation keywords are also defined as query terms).

According to an aspect of the invention the predefined flow estimation words are not necessarily correlated with the alert and query terms, and may even be terms that are filtered out by the alert module 3 or the search engine 26. The flow estimation keywords are usually terms that are frequently used words, such as words that are discarded by terms filter 49 of FIG. 2. The flow estimation unit 410 may be coupled to the agents of the retrieval means 13 or to the retrieval management and prioritization component 29. The retrieval management and prioritization unit component 29 is operable to perform load balancing and may be fed by the same inputs to determine the load as the flow estimation unit 410. Flow estimation information may be utilized for compensating for differences in the information exchange patterns of clients during distinct time periods. For example, during weekends and holidays the overall flow of data stream decreases in comparison to working days. Furthermore, less data is exchanged during the night.

Time zone unit 412 estimates the local time of an event that is described at a data stream. The determination is based upon the content of the data stream, and usually depends upon location/geographical information, such the name of a city, country and the like in which an event takes place. The geographic information can be determined from the identity of the person, company or other entity that may be included within the data stream. The determination may also be based upon the source of information, especially when the source of information usually provides information relating to a known geographical area.

Data builder 20 accesses data manager 22 and provides the dispatcher the requested information. For example, an alert can indicate that information source 30 provided at least one matching information packet that matches an alert criterion of client system 10. Dispatcher receives said alert and determines, in association with client manager 18 that the alert should contain additional information from the matching information source 30, such as a multimedia stream that was broadcasted by information source 30, whereas the matching information packets were driven from said multimedia stream.

Dispatcher sends data builder 20 a content object request to receive said multimedia stream. Said request usually determines the matching information ID and a content type/alert or query result format. Said multimedia stream is stored in a certain address within data manager 22, or in an external multimedia server (not shown). Said content object request to receive said address. Said address is provided to dispatcher 17 and via interface 13 and network 16 to client system 10. Eventually, said multimedia stream in displayed to the client. It is noted that the relevancy level of relevancy keywords that appear within the displayed multimedia streams are reflected in various manners, such as but not limited to, the color of the relevancy keyword, the color of the background of the relevancy keywords and the like.

Conveniently, distribution means 4 maintains a list of distributor identifications ID, distributor type and user counter for each alert.

Client manager 18 is adapted to manage client system information such as client system profile, preferences, and alert criteria.

History manager 21 is adapted to maintain alert criteria and requests to update said criteria for client retrieval. History manager 21 receives requests to update an alert criterion from dispatcher 17 and stores said requests, for allowing a client system to view said requests.

Query and alert manager 19 is operable to route client queries and alert criteria updates from dispatcher 17 and routes query results and alerts from analysis means 5 to dispatcher 17.

Retrieval means 6 includes a plurality of agents or receptors, such as agents 24, 27 and 28. Said agents are coupled to various information sources, such as information sources 30-36 via networks or via media. Agents 24, 27 and 28 are adapted to receive information from various information sources, such as television channel 30, radio channel 31, news provider 32, web sites 33, IRC servers 34, bulletin boards 35 and streaming media provider 36, and provide information packets to analysis means 5. For example, agent 24 receives television broadcasts or video streams via cable network 37 and converts the television broadcast or video stream to a stream of information packets. Agent 24 can include of a dedicated encoder, a device for extracting clause caption out of said video stream or picture recognition and analysis means. Agent 27 receives radio broadcasts, transmitted by radio channel 31 over a wireless media, and convert said transmitted audio stream to a stream on information packets. Agent 28 is coupled, via a network to news provider 32, web sites 33, IRC servers 34, bulletin boards 35 for retrieving information packets transmitted from said information sources via network 38. Retrieval means 6 further including of retrieval management and prioritization component 29 for prioritizing content sources and channels and for balancing the load between agents/receptors.

Alert module 3 is adapted to receive alert criteria from query and alert manager 19 and to constantly match said alert criteria against portions of received information packets, said information packets provided by retrieval means 6. When an alert criterion is fulfilled, an alert indication is provided to query and alert manager 19. Conveniently, said alert indication including of a query ID and an information packet ID. Dispatcher 17 receives said alert indication accesses client manager 18 to determine which client system is to receive an alert, what additional information to provide said client system and in what format to sent the alert to said client system. Accordingly, dispatcher sends a result object request to data builder 20. Data builder 20 accesses data manager 22, receives the additional information, provides said information to dispatcher 17, and provides an alert to a client system, via an interface and network 16.

Data Manager 22 is adapted to store received information packets, audio streams and video streams. Optionally, data manager 22 is further adapted to allow data clients to get notification on data events such as data changes, data expiration, etc. and is further adapted to allow data providers to register as such.

Alert module 3 allows generating alerts in real time, in response to previously provided alert criteria and information packets being received in real time. Alert module is adapted to support various alerts, such as Boolean alerts and best effort alerts.

Search engine 26 allows generating query results in real time. Search engine 26 is adapted to support various searching techniques, such as Boolean search and best effort search.

Classification module 25 is adapted to dynamic classification of information streams/groups of information packets. Classification module 25 dynamically determines a topic of a channel; thus allowing searches and alerts based upon a topic an information stream.

Relevancy Calculations

Some relevancy calculations are described below. It is noted that the provision of relevancy keywords, the determination of when a relevancy keyword is received and the determination and selection of flow keywords are explained in greater detail in accordance to FIGS. 2-8 illustrating the structure and operation of alert module 3 and search engine 26.

Generally speaking, the reception of each relevancy keyword is constantly monitored, and compared to previous reception patterns of that relevancy keyword.

The comparison results in a determination of the relevancy of each relevancy keyword. As previously mentioned, the reception may be also responsive to the flow patterns of received data streams and to the time in which the data was received.

Conveniently, the relevancy realm is partitioned into relevancy levels. The amount of levels and the partition between the various levels may vary. For convenience of explanation it is assumed that (a) there are eight relevancy levels; (ii) the previous reception pattern is determined during a period of sixty days, (iii) a current reception pattern reflects the reception of the relevancy keyword during a test period of either twenty four or twelve hours, (iv) the reception patterns are normalized in response to a flow estimation that is based upon the reception of flow keywords, (v) the reception patterns are reflected by an average amount of receptions during the period of sixty days and by a standard deviation of the daily averages during each day of the period of sixty days, (iv) the previous reception pattern is updated once a day, (v) the test period is in a form of a "sliding window" that ends at the current time. It is noted that other periods/"windows", and even non-consecutipe sequences of periods may be taken into account.

The following first set of equations illustrate relevancy levels thresholds for a test period of twenty-four hours, while the second set of equations illustrate relevancy levels thresholds for a test period of twelve hours.

The two sets of equations illustrate nine relevancy levels. It is noted that each relevancy keyword is characterized by a keyword reference population and by a 24_hour and 12_hour normalized keyword current reception values. The keyword reference population includes samples that reflect the reception of that relevancy keyword during a period of sixty days in relation to an aggregate amount of reception of each flow keywords during these sixty days.

A 24_hour normalized keyword current reception value (also denoted 24 hrv) is a ratio between the amount of reception of that relevancy keyword during the last twenty-four hours and between the total amount of flow keywords received during these twenty four hours. A 12_hour normalized keyword current reception value (also denoted 12 hrv) is a ratio between the amount of reception of that relevancy keyword during the last twelve hours and between the total amount of flow keywords received during these twelve hours.

According to an aspect of the invention the relevancy level is determined in response to a single comparison, either between the 12_hour normalized keyword current reception value (also referred to as 12 hrv) and the thresholds of second set of equations or between the 24_hour normalized keyword current reception value (also referred to as 24 hrv) and the thresholds of first set of equations. It is noted that the relevancy value determination may be responsive to a combination of both comparisons, such as but not limited to an linear combination, a non-linear combination, an average of those values, a maximal value out of the two values.

The nine relevancy values are numbered −4, −3, −2, −1, 0, 1, 2, 3 and 4, whereas a zero relevancy level reflects a relevancy keyword that is received in accordance to previous reception patterns, the positive relevancy levels reflect relevancy keywords that are received more often then their previous reception patterns, and vice verse.

The term "avg" as being used in the following equations is the average of normalized keyword reception value during the sixty day period.

The term "std" as being used in the following equations is the standard deviation of the normalized keyword reception value during the sixty day period.

For a 24 hour period the relevancy of each relevancy keyword is determined by:

(1.1) Relevancy level is −4 if 24 hrv is equal to or smaller than avg−std
(1.2) Relevancy value is −3 if 24 hrv is greater than avg−std but smaller than or equal to avg−0.8×std
(1.3) Relevancy level is −2 if 24 hrv is greater than avg−0.8×std but smaller than or equal to avg−0.65×std
(1.4) Relevancy level is −1 if 24 hrv is greater than avg−0.65×std but smaller than or equal to avg−0.5×std
(1.5) Relevancy level is 0 if 24 hrv is greater than avg−0.5×std but smaller than or equal to $$\text{avg} + \left(0.25 + \frac{0.25}{\ln(1.05 + \text{avg})}\right) \times \text{std}.$$

(1.6) Relevancy level is 1 if 24 hrv is greater than $$\text{avg} + \left(0.25 + \frac{0.25}{\ln(1.05 + \text{avg})}\right) \times \text{std}$$

$$\text{avg} + \left(0.85 + \frac{0.5}{\ln(1.05 + \text{avg})}\right) \times \text{std}.$$

but smaller than or equal to
(1.7) Relevancy level is 2 if 24 hrv is greater than $$\text{avg} + \left(0.85 + \frac{0.5}{\ln(1.05 + \text{avg})}\right) \times \text{std}$$

$$\text{avg} + \left(1.5 + \frac{0.75}{\ln(1.05 + \text{avg})}\right) \times \text{std}.$$

but smaller than or equal to
(1.8) Relevancy level is 3 if 24 hrv is greater than $$\text{avg} + \left(1.5 + \frac{0.75}{\ln(1.05 + \text{avg})}\right) \times \text{std}$$

$$\text{avg} + \left(2.2 + \frac{1}{\ln(1.05 + \text{avg})}\right) \times \text{std}.$$

but smaller than or equal to
(1.9) Relevancy level is 4 if 24 hrv is greater than $$\text{avg} + \left(2.2 + \frac{1}{\ln(1.05 + \text{avg})}\right) \times \text{std}.$$

For a 12 hour period the relevancy of each relevancy keyword is determined by:

(2.1) Relevancy level is −4 if 12 hrv is equal to or smaller than avg−1.2×std
(2.2) Relevancy value is −3 if 12 hrv is greater than avg−1.2×std but smaller than or equal to avg−1×std (2.3) Relevancy level is −2 if 12 hrv is greater than avg−1×std but smaller than or equal to avg−0.85×std
(2.4) Relevancy level is −1 if 12 hrv is greater than avg−0.85×std but smaller than or equal to avg−0.7×std
(2.5) Relevancy level is 0 if 12 hrv is greater than avg−0.7×std but smaller than or equal to $$\text{avg} + \left(0.45 + \frac{0.45}{\ln(1.05 + \text{avg})}\right) \times \text{std.}$$

(2.6) Relevancy level is 1 if 12 hrv is greater than $$\text{avg} + \left(0.45 + \frac{0.45}{\ln(1.05 + \text{avg})}\right) \times \text{std}$$

$$\text{avg} + \left(1.05 + \frac{0.7}{\ln(1.05 + \text{avg})}\right) \times \text{std.}$$

but smaller than or equal to
(2.7) Relevancy level is 2 if 12 hrv is greater than $$\text{avg} + \left(1.05 + \frac{0.7}{\ln(1.05 + \text{avg})}\right) \times \text{std}$$

$$\text{avg} + \left(1.7 + \frac{0.95}{\ln(1.05 + \text{avg})}\right) \times \text{std.}$$

but smaller than or equal to
(2.8) Relevancy level is 3 if 12 hrv is greater than $$\text{avg} + \left(1.7 + \frac{0.95}{\ln(1.05 + \text{avg})}\right) \times \text{std}$$

$$\text{avg} + \left(2.4 + \frac{1.2}{\ln(1.05 + \text{avg})}\right) \times \text{std.}$$

but smaller than or equal to
(2.9) Relevancy level is 4 is 12 hrv is greater than $$\text{avg} + \left(2.4 + \frac{1.2}{\ln(1.05 + \text{avg})}\right) \times \text{std.}$$

Relevancy Determination Unit

Figure 1B:
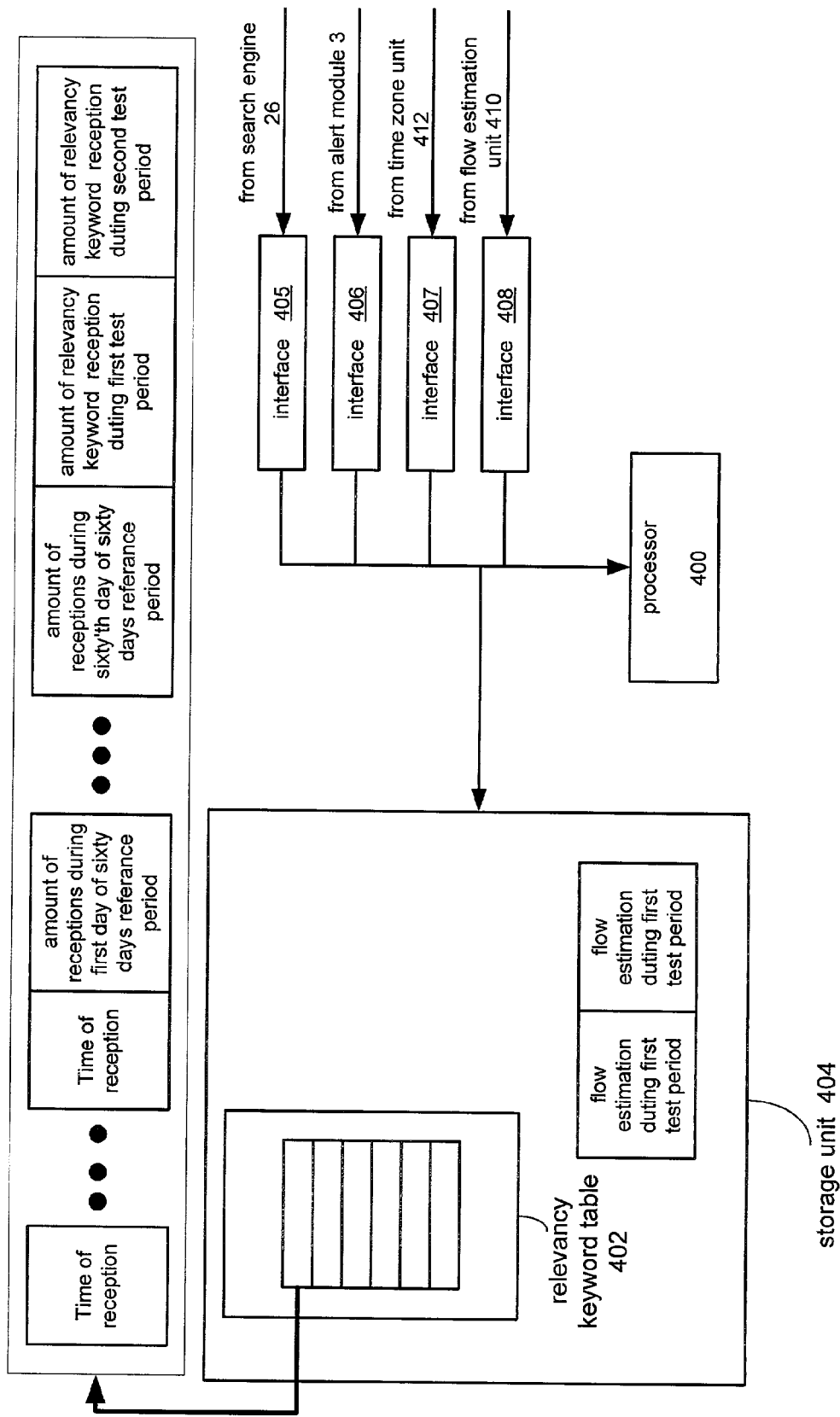
FIG. 1b is an illustration of a relevancy determination unit 2, in accordance with a preferred embodiment of the present disclosure.

FIG. 1b illustrates various optional modules/portions of relevancy determination unit 2.

It is noted that relevancy determination unit 2 may have its own filtering and processing capabilities, such as those of alert module 3 or search engine 26 for allowing the extraction of terms from received data streams and a comparison of the extracted terms to relevancy keywords and flow keywords. FIG. 1b illustrates a relevancy determination unit 2 in a scenario where alert terms and query terms are the relevancy keywords and are provided by alert module 3 and search engine 26.

Relevancy determination unit 2 has a plurality of interfaces, such as first interface 405 for receiving information from search engine 26, second interface 406 for receiving information from alert module 3, fourth interface 407 for receiving information from time zone unit 412 and fifth interface 408 for receiving information from flow estimation unit 410. Relevancy determination unit 2 also has processor 400 for calculating current reception patterns and previous reception patterns in response to the reception of information relating to the reception of relevancy keywords and a storage unit 404, coupled to the first interface and the processor, for storing current reception patterns, previous reception patterns and information relating to the reception of relevancy keywords. Storage unit 404 stores relevancy keyword table 402

Whenever search module 26 detects that a query term was received it updates the relevancy determination unit 2, whenever alert module detects that an alert term was received it updates relevancy determination unit 2.

Whenever a client updates an alert criteria or provides a query the update (the alert terms that form the alert criteria or the query terms, accordingly) is provided to relevancy determination unit 2 that updates its relevancy keyword database. If the relevancy keywords are also flow keywords, the flow keyword database is also updated.

Relevancy determination unit 2 differs from search engine 26 and alert module 3 in that it stores information about the reception of a relevancy keyword up till sixty days from the last reception of the relevancy keyword. Accordingly, even after a query term is deleted from the search engine and even after an alert term is deleted from alert module 3, the keyword and its statistics still remain.

The relevancy keywords are stored in a relevancy keyword table 402. Relevancy keyword table 402 comprises of entries whose keys are terms. Therefore, relevancy keyword table 402 provides fast access to the entries by using terms as access keys. The said structure also provides for fast insertion of terms into the table. Each entry of relevancy keyword table 402 stores both reference statistics and test period data of the relevant reference keyword. For example, an entry of a relevancy keyword may store the amount of reception of the relevancy keyword during the current test period, and also stores statistics reflecting the reception of the relevancy term during the reference period of sixty days. The time of reception (or modified time of reception in response to time zone information) is stored until the test period is "moved" such as to place the reception time outside the test period.

It is noted that there may be time periods, during the reference period, during which the relevancy determination unit 2 does not receive any indication of a reception of a relevancy keyword. This may occur when a query term is deleted or an alert criterion is altered. In such a case these periods are not taken into account in the reception statistics. This may be avoided if these query terms are still stored and compared to incoming extracted terms during the sixty days period.

Assuming that the relevancy keywords are query terms and alert terms then whenever they are updated the relevancy keyword table 402 either adds an entry to the table or updates the statistics of an entry.

In a periodical manner, the content of relevancy keyword table 402 is scanned and processed by processor 400 to update the relevancy statistics. The relevancy statistics are responsive to flow statistics, as being provided by flow estimation unit 410. Preferably, the flow statistics are provided by either alert module 3 or search engine 26 that filter out (and at the same time update relevancy determination unit 2) frequently used words.

The determination of relevancy levels of relevancy keywords is followed by a step of updating clients, and especially clients that provided the query terms. The alert terms. The update may be in a graphical form, such as to paint or otherwise emphasize query terms that are displayed on the display unit of a client. The update is provided to clients by dispatching means, as the query results and alarms are provided to these clients.

Alert Module

Patent application titled "System and Method for Alerts", Ser. No. 09/654,801 filed at Sep. 5, 2000 and assigned to eNow Inc., is incorporated in its entirely by reference.

Figure 2:
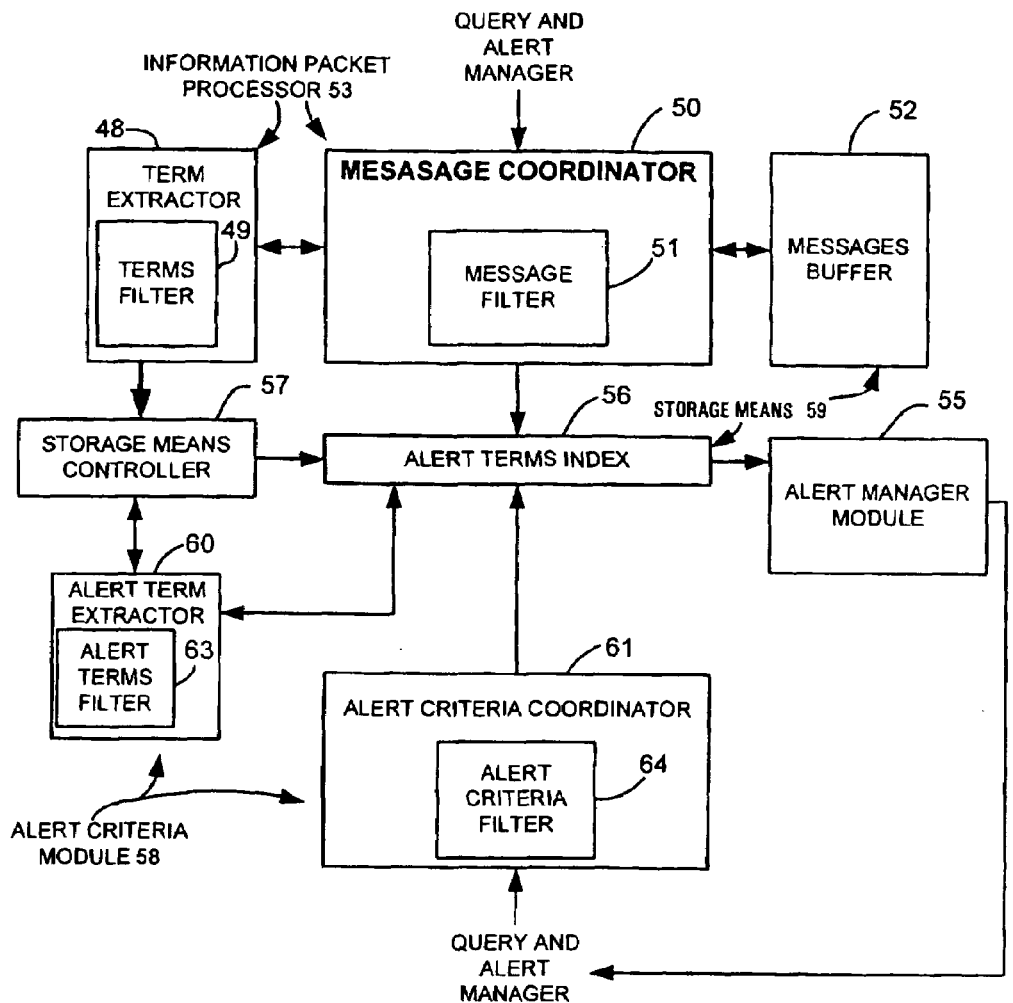
FIG. 2 is a simplified block diagram that illustrates an alert module operations in association with related modules and data structures, in accordance with a preferred embodiment of the present disclosure.

FIG. 2 illustrates various optional modules/portions of alert module 3, such as, but not limited to message coordinator 50, message filter 51, terms filter 49, alert criteria term filter 63, alert criteria extractor 60.

Alert module 3 has information packet processor 53, storage means 59, storage means controller 57, alert module 55 and alert criteria module 58.

Information packet processor 53 having: message coordinator module 50 adapted to coordinate an handling of a plurality of information packets; message filter module 51 for filtering the plurality of information packets according to predefined rules; term extractor module 48 for performing parsing and stemming on said plurality of information packets; and terms filter 49 for excluding extracted terms according to predefined rules.

Storage means 59 have terms index 56 and messages buffer 52.

Alert criteria module 58 having: alert criteria coordinator module 61 to coordinate the processing of alert criteria; alert term extractor 60 to parse and stem incoming alert criteria in order to extract and process operative alert terms; alert terms filter 63 for excluding specific alert terms in a predefined manner. Alert criteria further comprising additional information such as information defining a relationship between alert terms, a client system identifier for determining which client provided said alert criteria, a weighing factor and a similarity threshold. Said additional information is not preprocessed but stored in storage means. Preferably, said additional information is stored in an alert criteria map.

In the preferred embodiment of the present disclosure, one information source may be a television channel that provided multimedia streams that are later transformed into streams of information packet messages. It should be understood that in the following discussion of the present disclosure the general framework of television channels is used for purposes of description not limitation. Said search engine received text that is being either associated to the content of television channels or driven out of a multimedia stream provided by television stations. Text can be driven from a multimedia stream by various means such as special encoders, voice recognition means. Many television channels provide text in a format of clause caption. Although information packets will be referred to as messages, and information sources will be referred to as channels in the text of this document, it will be appreciated that in different embodiments of the present disclosure other sources of information could be used such as news channels, video channels, music channels, various Internet sites and the like. It will also be appreciated that in other embodiments of the present disclosure, the information packets processed could be in addition to text format in other diverse data formats such as streaming video, still pictures, sound, applets and the like.

The messages from the various channels are retrieved by retrieval means 6 and eventually provided to alert module 3. The messages are received by Messages Coordinator Module 50 for processing. The messages transferred consist of control data such as channel ID, Message ID, timestamp of the time of arrival, and information content such as a phrase, a sentence, a news item, a music item or a video item.

Messages Coordinator 50 coordinates the handling of the incoming messages, and provides processed messages to term extractor 48 and to messages buffer 52. Messages Buffer 52 is a data structure that temporarily holds the incoming messages. In the preferred embodiment of present disclosure Messages Buffer 52 is a cyclic buffer. Message Filter 51 filters messages according to user-defined rules. For example, messages with a specific channel ID or messages containing specific text might be blocked and discarded.

Term Extractor 49 receives the messages from Messages coordinator 48, performs message parsing, and stemming (finding the lexicographic root) of the resulting terms. Once the message is parsed and stemmed, a list of terms within said message is created. The terms extracted are sent to further processing accompanied with identifying data such as channel ID, message ID and the message arrival time. Terms Filter 49 passes the terms through a series of filters, which can change or discard specific terms. For example, Terms Filter 49 can discard stop-words, frequently used words, one-character words, user-defined words, system-defined words such as "a", "about", "else", "this", and the like. According to an aspect of the invention frequently used words may be used for flow estimation. In such a case whenever such a word is received (and discarded) a flow indication is updated. The update may be done by relevancy determination unit 2 or by flow estimation unit 410.

Storage means controller 57 receiving the at least one extracted term, accesses alert terms index 56, determines whether an extracted term out of said at least one extracted term matches an alert term stored in alert terms index 56 and accordingly updates the matching term information stored within alert term index 56. Extracted terms that do not match any alert term are discarded. Storage means controller 57 also schedules and initiates periodically a process that removes information regarding matches between an alert criterion and between irrelevant or time-decayed terms from alert terms Index 56. Description of the process will be set forth hereunder.

Alert terms Index 56 consists of indexed alert terms and message identifiers that point to information relating to a reception extracted terms that match an alert term during a predetermined period of time. Alert terms Index 56 is designed to enable fast term indexing and deletion. The indexing is done per matching term, while deletion is done per message. When the message is discarded for becoming irrelevant or time-decayed, information regarding a reception of matching terms being extracted from said information packet is deleted from alert terms Index 56. Alert terms Index 56 is a means to realize alerts regarding real time content.

According to one preferred embodiment of the invention, at least a portion of a request to create or update an alert criteria pass through alert criteria coordinator 61, alert criteria terms extractor 60 alert terms filter 63 and undergo preprocessing steps that are analogues to preprocessing steps of a massage. An alert criterion can contain several alert terms, and associated information such as a weighing factor, or a similarity threshold. Said associated information does not undergo said preprocessing steps.

Alert module 55, coupled to storage means 59, for processing at least a portion of the matching extracted term information to determine whether to issue an alert; and for issuing at least one alert to at least one client system, according to said determination. Conveniently, when a matching extracted term that matches an alert term is received, alert module 55 checks in which alert criteria said alert term is found, and processes matching extracted term information associated to said alert criteria to determine which alert criteria are fulfilled, and to which client systems to issue an alert.

According to an aspect of invention alert module 3 provides indications of a reception of alert terms and matches between alert criteria and received data to relevancy determination unit 2. Relevancy determination unit 2 determines whether the received alert term or alert criteria are relevancy keywords, and if so—updates the updates the relevancy keyword statistics accordingly. It is noted that the determination of whether to send such information may be processed by an additional unit within alert module 3.

The operation of the alert module 3 will be described next. Information packets are extracted out of an incoming information stream. The messages are structured, times-stamped and transferred to the operative modules of the alert module 3. The structured messages contain control data such as channel ID, message ID, time stamp indicative of the time of arrival and content information such as textual data. The messages transferred through Message Filter 51 which blocks specific messages according to predefined rules. For example, messages originating in particular channels or having specific text content or having particular characteristics could be discarded. The filtered messages are inserted into Messages Buffer 52 which is managed and synchronized by Messages Coordinator 50. Messages coordinator 50 operates in conjunction with Messages Buffer 52, which is designed to hold the messages to be retrieved for later processing. Messages Buffer 52 is a cyclic buffer. Incoming messages are inserted at one end of the Messages buffer 52 while retrieved from the other end. The messages are kept in the buffer for a predefined period of time. Time-decayed messages may be discarded. In other embodiments of the disclosure, other methods could be used to delete messages from Messages Buffer 52 such as deletion by predefined priorities. For example, messages from a specific low-priority channel could be discarded first. When a message is deleted from message buffer 52 information relating to the reception of extracted terms that were extracted from said messages are deleted from term index. Message coordinator 50 provides messages to Term Extractor 48. Term Extractor 48 performs message parsing, stemming (finding the lexicographic root) of the resulting tokens and extracts the tokens from the messages. The tokens are transferred through a series of Terms Filters 49. Terms Filters 49 can change or discard a token according to predefined parameters. For example, Terms Filters 49 can discard stop-words, one-letter words, frequently used words, user-predefined words and the like. Term Extractor 48 further attaches identifiers to the tokens such as channel ID, message ID and time of arrival. Finally, Term Extractor 48 dispatches the terms to storage means controller 57. Storage means controller 57 receives at least one extracted term and accesses alert terms hash 56 to determine whether an extracted term matches a term alert previously stored within alert terms index 56. If the answer is yes storage means controller 57 updated matching extracted term information, representative of a reception of a matching extracted term.

Conveniently a reception of a matching extracted term initiates a process of checking at least a portion of the matching extracted information to determine whether an alert criteria was fulfilled.

Alert terms Index 56 is a data structure containing entries indexed by extracted terms and matching extracted term information.

A more detailed description of the operations related to inserting terms and removing terms from alert terms index 56 would be set forth hereunder in association with the related drawing.

Clients via dispatcher means initiate alert criterion and a request to update alert criterion. Conveniently, the handling of an request to update or create an alert criteria by alert criteria module 58 is analogues to the handling of an incoming message, but portions of said request dare not preprocessed in the same manner. Alert criteria are filtered by alert criteria filter 64, and handled by alert criteria coordinator 61. Alert criteria coordinator 61 functions in respect to the incoming alert criteria in a like manner to Messages Coordinator 50 functions in respect to the incoming messages. Alert criteria coordinator 61 receives the queries and transfers them to the alert term extractor 60. Alert term extractor 60 parses the alert criteria and stems the resulting tokens. The tokens are filtered by a series of alert criteria filters 63, structured into alert-terms by the attachment of control information such as alert criteria Id and time-stamp.

Scoring, or ranking of channels to be returned as a result, is done using a model that computes the similarity between an alert criterion and a group of information packets provided by a single information source. Some of the parameters involved in computing the results are: Total amounts of terms in channel in the predefined time interval, number of matching terms in the channel in the predefined time interval, total number of channels searched in the predefined time interval, elapsed time since the last appearance of the matching term in the channel in the predefined time interval and matching terms position in the channel. Additional factors for the score: terms in proximity to matching term, part of speech of matching terms, relevant term frequency and importance in the language of the channel.

The parameters further enable alert management module 55 to rank the resulting channels, and to generate a similarity rank, to be further compared to an alert similarity threshold, in addition to standard ranking methods by the time parameter as well by giving more weight to phrases than to the collection of single words.

Figure 3:
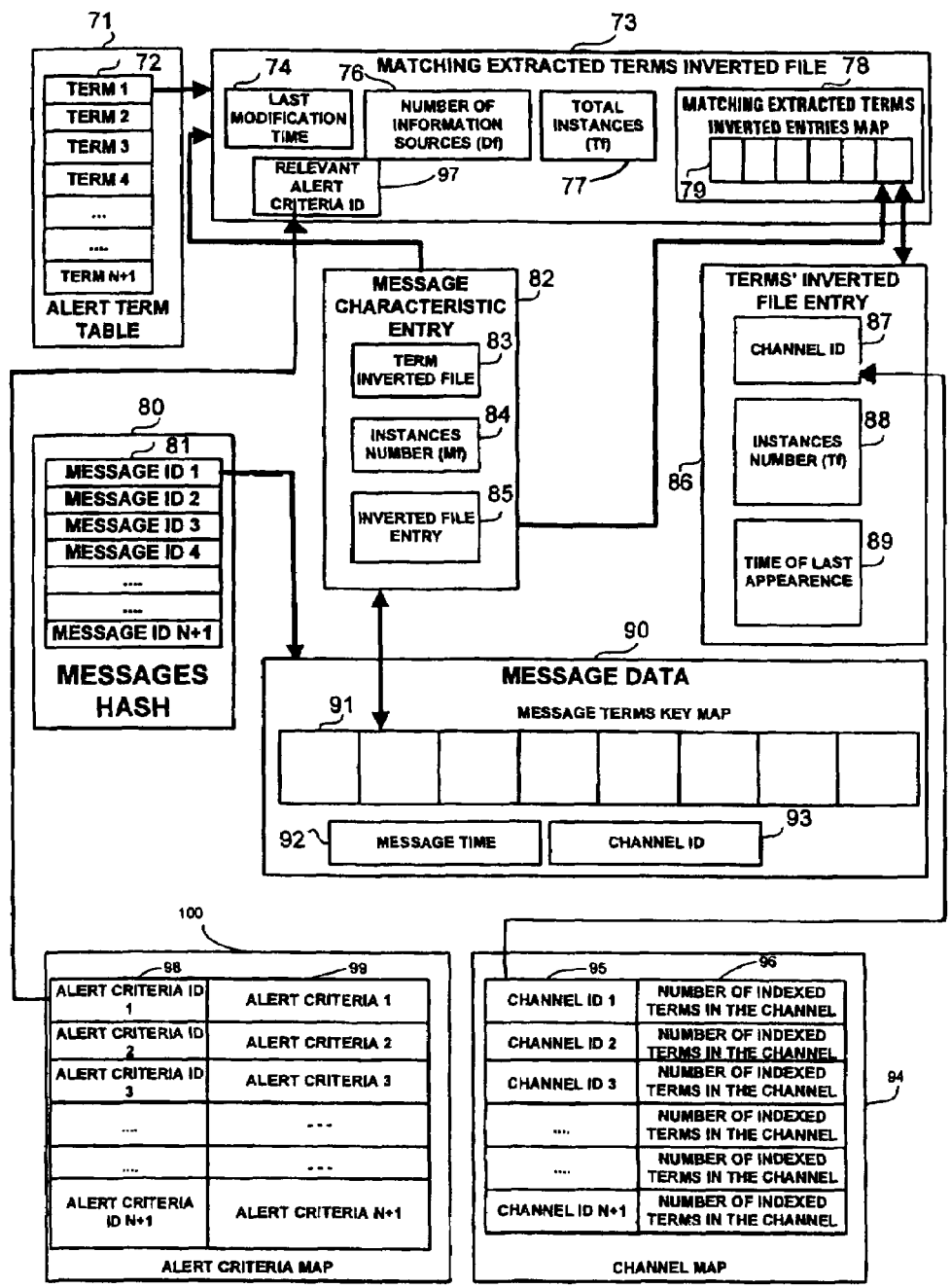
FIG. 3 is a simplified block diagram that illustrates the structure of the alerts index tables, in accordance with a preferred embodiment of the present disclosure.

Referring now to FIG. 3 that illustrates the structure of the alert terms index 56 tables. The alert terms Index consists of two main units: the alert terms hash 71 and the messages hash 80. Additionally alert terms Index contains the Channel Map unit 94.

Alert terms hash 71 comprises the alert term table 72 and the associated extracted matching terms Inverted File 73. The alert term Hash 71 comprises of entries whose keys are terms. Therefore, alert term Hash 71 provides fast access to the entries by using terms as access keys. The said structure also provides for fast insertion of terms into the table. Alert term table 72 stores a plurality of alert terms, provided by client systems. Extracted matching terms inverted file 73 stores matching extracted terms information, representative of a reception of extracted terms that match alert terms during a predetermined period of time. Said extracted terms are also referred to an extracted matching terms.

The matching extracted terms inverted file 73 comprises of a sorted list of matching extracted terms inverted entries map 78 and at least one of the following files: (a) a total number of references (Total Instances) 77 to the matching extracted term in all the messages currently stored in Messages Buffer 52 of FIG. 2, (b) the modification time of the extracted matching term (Last Modification Time) 74, or (c) a number of channels that contain the extracted matching term 76. Each entry, such as entry 786 in extracted matching terms inverted entries map 78 is keyed by the channel ID 87 and has the number of references (Instances No) 88 to the extracted matching term in that channel and the time of the last appearance of the extracted matching term in the channel (Time of Last Appearance) 89. The number of references that are added to the Total Instances 77 could be used to determine the channel's relevance to a specific alert criterion.

Messages Hash 80 indexed by Message ID 81 in order to provide fast deletion of term's references by message. Messages Hash 80 comprises Message ID table 81 and the associated Message Data table 90. Each entry in Message Data table 90 contains information about one message and pointed to by a Message Hash entry 81. Message Data table 90 consists of (a) the channel ID 93 (b) message time 92, and (c) Message Terms Keyed Map 91. The Message Terms Keyed Map 91 is a sorted list of Message Characteristics Entries 82. A pointer 83 keys each entry, which is unique to each term. Therefore, a Message Characteristics Entry 82 can be found easily by a specific term. Message Characteristics Entry 82 contains the following information: (a) the number of times the related extracted matching term was referred to in the relevant message (Instances No) 84, and (b) a pointer to the related Inverted File Entry 85.

The Channel Map 94 is a list sorted by channel IDs 95. For each channel ID 95, Channel Map 94 holds the total number of currently indexed extracted matching terms that belong to the channel 96. In the preferred embodiment of the present disclosure, said total number relates to the number of extracted matching terms after filtering. In a different embodiment of the present disclosure, the total number could relate to the number of extracted matching terms before filtering or to the average of both values.

The alert criteria map 100 is a list sorted by a criterion IDs 98. For each alert ID 98, alert criteria map 100 holds an alert criterion. An alert criteria can hold more than a single alert term, a weighing factor given to each alert term of the alert criteria, a similarity factor and the alert term ID of each of the alert terms of said alert criteria, for allowing to process matching extracted term information representative of a reception of terms of the alert criteria. Alert criteria map 100 is built and updated according to requests issued by client systems.

The operations supported by the alert terms index 56 of FIG. 2 will be described next. Alert terms index 56 of FIG. 2 supports three modes of operation: (1) an update, a deletion or creation of an alert criteria, (2) extracted matching information deletion by message ID, and (3) extracted matching term information deletion by the garbage collection process.

An alert criteria is updated, deleted or created by storage means controller 57, in response to a reception of a request from a client system. The whole update criteria is given an alert criteria ID, said ID and the alert criteria are stored in alert criteria map 100. Each alert term of the alert criteria is indexed and inserted to alert terms index 56.

Storage means controller 57 handles an update of matching extracted information when an extracted term that matches an alert term is received. Accordingly, the following sequence of steps is performed:

The alert Term 72 to extracted matching Terms Inverted File 73 link is accessed or created. A pointer to extracted matching Terms Inverted File (invertedFilePtr) is saved.

The Total Instances 77 member's value in extracted matching Terms Inverted File 73 pointed at by invertedFilePtr is increased by one.

The Last Modification Time 74 member in extracted matching Terms Inverted File 73 pointed at by invertedFilePtr is updated.

The entry for channel Id 87 in extracted matching Terms Inverted Entries Map 79 is accessed or created. A pointer to the entry is saved as invertedFileEntryPtr.

The value of Instances No 88 member in the entry pointed at by invertedFileEntryPtr is increased by one.

The appropriate Message Data is accessed or created in Message Hash 80. A pointer to the entry is saved as messageData.

The Message Characteristic Entry 82 in Message Data 90/Message Terms Keyed Map 91 is accessed by invertedFilePtr or created. A pointer to the entry is saved as messagecharac.

In the entry pointed at by messagecharac the value of Instances Number 84 member is increased by one.

In the entry pointed at by messagecharac, the invertedFileEntry pointer is set to point at invertedFileEntryPtr.

In the Message Data 90, the Message Time 92 member is updated.

In the Message Data 90 the channel ID 93 member is updated.

A deletion of extracted matching term information representative of a reception of matching extracted terms extracted from a message occurs when a message is deleted. A message can be deleted when the Messages Buffer 52 of FIG. 2 is full or a predetermined time interval indicative of the period a message should be kept in the buffer 52 has been completed.

For extracted matching term information deletion by Message Id the following sequence of steps is performed:

The appropriate Message Terms Keyed Map 91 is obtained from Messages Hash 80.

For each Message Characteristics Entry 82 that points to extracted matching Terms Inverted File 73:

The pointed extracted matching Terms Inverted File 73 is accessed and Total Instances 77 member's value is decreased by the Instances No 84 member's value in Message Characteristic Entry 82.

The Term Inverted Entry 86 is accessed and the Instance Number 88 value is decreased by Message Characteristic Entry's local Instances No member 84 value.

Message Characteristic Entry 82 is deleted.

Steps 'c' through 'e' are repeated until Message Terms Keyed Map 91 is empty.

The Message Id 81/Message Terms Keyed Map 91 link is deleted.

Deleting an extracted matching term information not via Message Id 81 is done periodically by the garbage collecting process. The deletion is performed if the extracted matching term's last modification time occurred before a specific point in time in the past which implies that there are currently no messages that the specific extracted matching term refers to or that the extracted matching term's Total Instances 77 member's value equals zero. When an extracted matching term is found that satisfies the above conditions a simple deletion of the alert Term 72 to extracted matching Terms Inverted File 73 link is performed.

According to another preferred embodiment of the invention, a single data structure can support both real time searches and alerts. Terms Index Table will store alert criteria and received terms. An alert criterion will not be deleted from terms index unless a client system requested such a deletion. Each entry of the table will have an additional field, for identifying the indexed term as at least a portion of an alert criterion or as a received extracted term. According to said embodiment, when storage means controller 57 receives an extracted term is determines whether said extracted term matchers matches an alert term, and if the answer is 'no' said term is indexed in alert terms hash 56, with an indication that it is not an alert term. Said extracted term can be deleted from alert terms module 56 by message ID or by a garbage collecting process.

Figure 6:
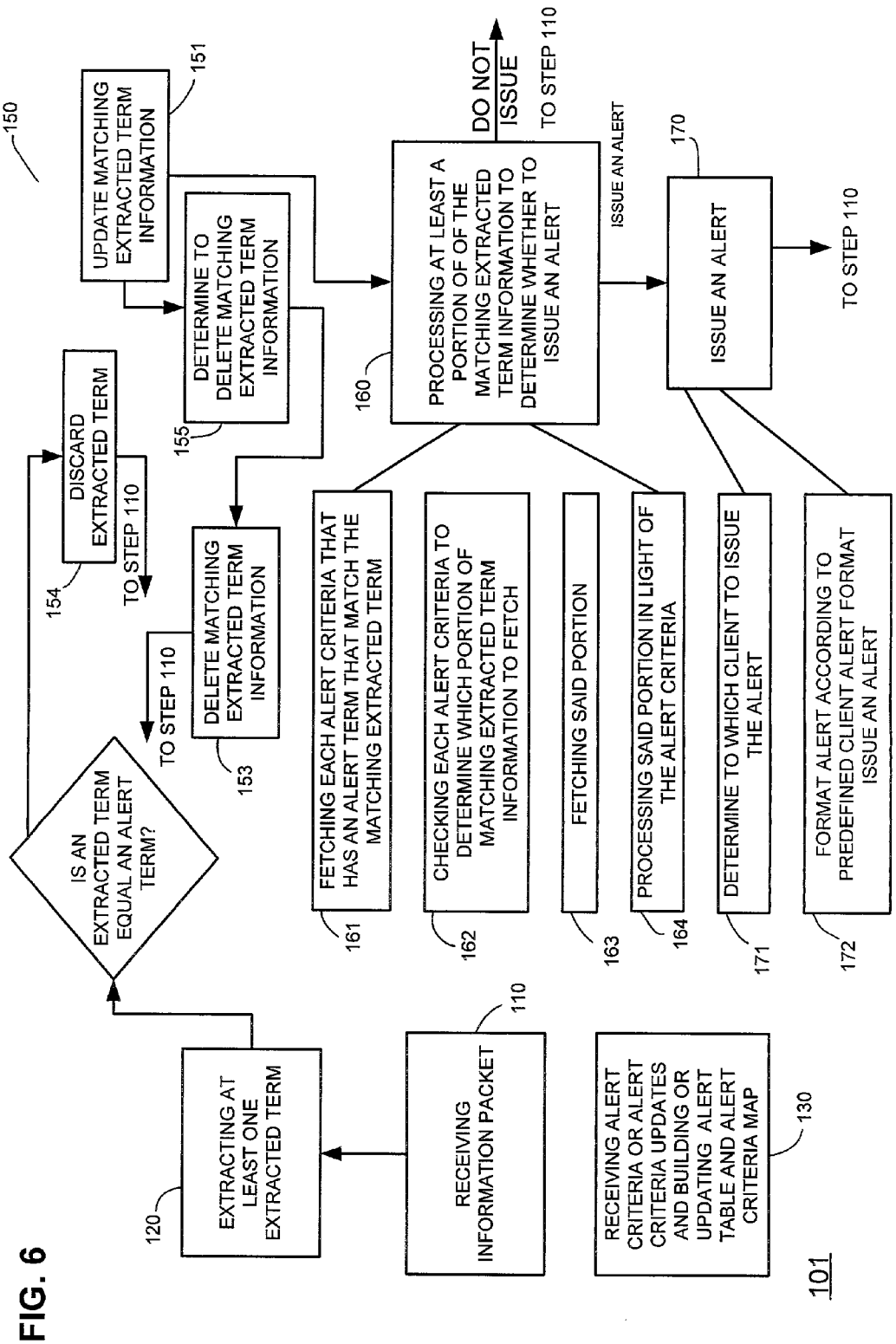
FIGS. 6-8 are flow charts illustrating a method for real time alert, in accordance with a preferred embodiment of the invention.
Figure 7:
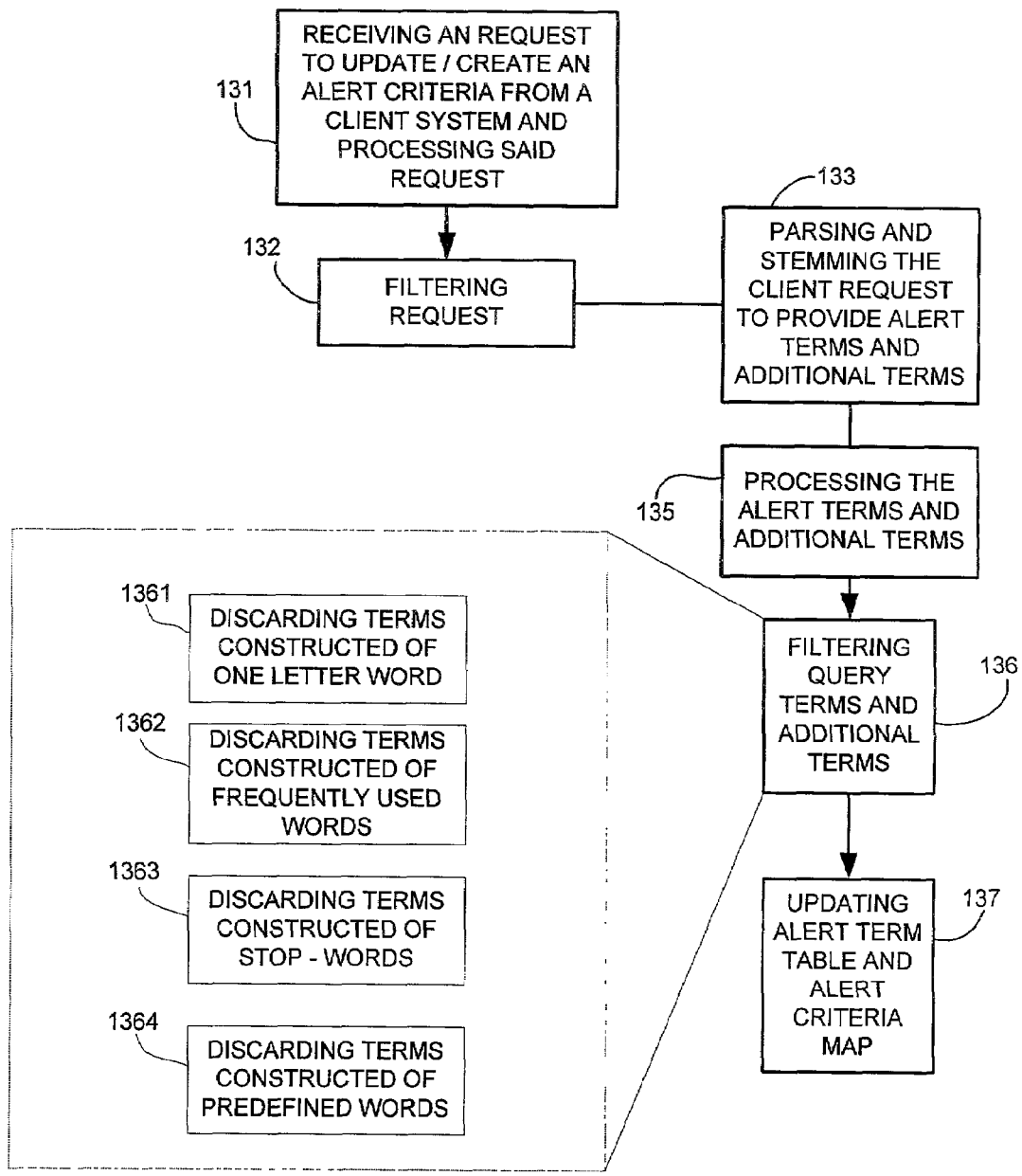
Figure 8:
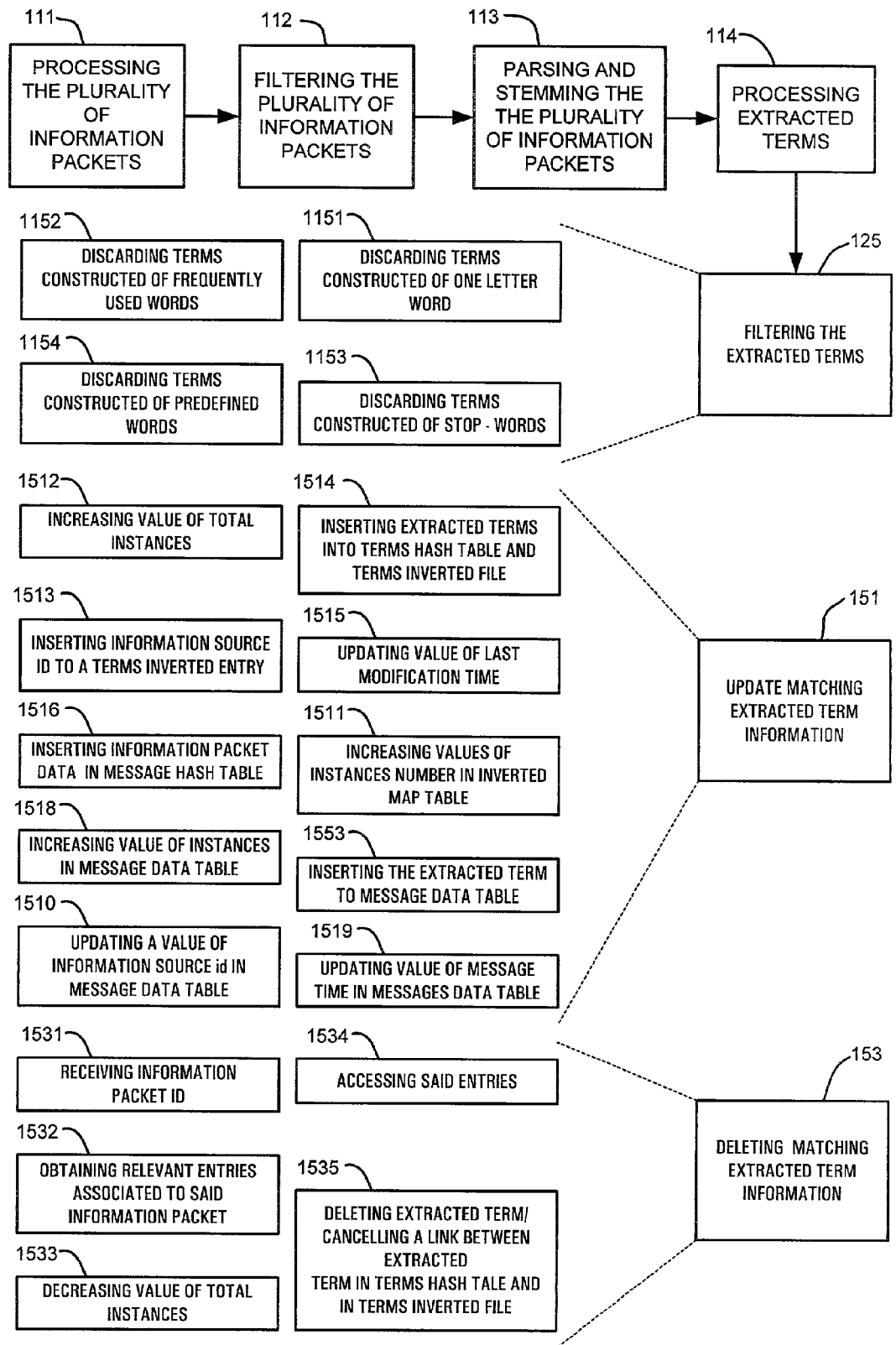

Referring to FIGS. 6-8 illustrating method 101 for real time alerts, method 101 comprising of the following steps:

Step 110 of receiving an information packet; said information packets either provided by an information source or representative of a portion of a received signal provided by an information source.

Step 110 is followed by step 120 of extracting at least one extracted term out of the information packet.

Step 120 is followed by step 150 of determining whether an extracted term out of said at least one extracted term matches an alert term, and accordingly either discarding said extracted term (step 154) or updating (step 151) a matching term information representative of a reception of matching extracted terms, an alert criteria comprising of at least one alert term, said matching term information being stored in a storage means that is configured to allow fast insertion and fast deletion of content. The matching term information is also provided to relevancy determination unit 2.

Conveniently, step 150 is preceded by step 130 of receiving alert criteria from client systems and processing said criteria to update or create an entry in alert term table 72 and alert criteria map 101. Conveniently step 154 is followed by step 110.

Steps 160 and 155 follow step 151. Step 160 of processing at least a portion of the matching extracted term information to determine whether to issue an alert. Conveniently, said processing step can implement complex matching techniques, Boolean matching techniques, probabilistic matching techniques; fuzzy matching techniques; proximity matching techniques; and vector based matching techniques. Said process can be based upon an analysis of the matching extracted term information representative of a reception of matching extracted terms from a single information source, said information source being identified by a channel ID. Conveniently, a portion of the matching extracted term information that is processed, said portion is determined by an alert criteria. Preferably, said alert criteria comprising of the at least matching extracted term received in step 110. If, for example, a matching extracted term is a part of an alert criteria, said alert criteria further comprising an additional alert term, a portion of matching extracted term information representative of both alert terms is processed in order to determine whether to issue an alert.

Step 160 is followed by step 170 of issuing at least one alert to at least one client system, according to said determination. Step 170 further comprises sending relevancy determination unit 2 the alert.

Step 155 of determining to delete a message and accordingly to delete matching extracted term information representative of a reception of matching extracted terms extracted from said information packet.

Conveniently, steps 110 and 120 further comprise additional preprocessing step, such as: step 111 of processing the plurality of information packets by adding control data to said information packets. The control data comprising of information packet identification, information source identification and time of arrival. Step 112 of filtering the plurality of information packets. Step 113 of parsing and stemming the plurality of information packets. Step 124 of processing said extracted terms by adding control information to said extracted terms. Step 125 of filtering the extracted terms to generate filtered extracted terms. Preferably, step 125 further comprising at least one of the following steps: step 1251 of discarding said terms constructed of one-letter words; step 1252 of discarding said terms constructed of frequently used words; step 1253 of discarding said terms constructed of stop-words and step 1254 of discarding said terms constructed of predefined words.

Step 151 of updating a matching extracted term information conveniently involves the steps of storing the information packet and related control data in the storage means; and linking between the stored information packet and the matching extracted term information. Preferably, step 151 comprising the following steps: step 1512 of increasing a value of total instances in a matching extracted terms inverted file associated to said matching extracted term; step 1513 of updating a value of last modification time in said accordingly updating a matching extracted terms inverted file; step 1514 of inserting an information source identification, said information source provided the extracted term, to a matching extracted terms inverted entry map table in said terms inverted file; step 1515 of increasing a value of instances number in said matching extracted inverted entry map table associated with said information source identification in said matching extracted terms inverted file; step 1516 of inserting information packet data in a messages hash table; step 1517 of inserting the matching extracted term from said information packet to a messages data table; step 1518 of increasing a value of instances in said messages data table by one; step 1519 of updating a value of message time in said messages data table; and step 1510 of updating a value of information source identification in said message data table.

Step 151 is followed by step 153 of deleting from the matching extracted terms index data structure the matching extracted term information representative of reception of matching extracted term extracted from an information. Said deletion occurs either after a message from which said term was expired is stored in the message buffer for a predetermined period of time. Said matching extracted term information can also be deleted as a result of a garbage collection process, said process is based upon a deletion of matching extracted terms that are not mentioned during a certain period.

Preferably, step 153 comprising the steps of: step 1531 of receiving an information packet identification, whereas the matching extracted term information representative of reception of matching extracted terms extracted from the information packets are to be deleted; step 1532 of reading the information packet identification from the messages hash table in said alert terms index data structure; step 1532 of obtaining relevant entries of said extracted terms belonging to said information packet in said messages data; step 1533 of accessing said matching extracted terms inverted file for each said terms entry pointed to said matching extracted terms inverted file; and step 1534 of decreasing a value of said total instances by a value of said instances number for each said terms entry pointed to said matching extracted terms inverted file. Step 153 further comprises of step 1535 of deleting a matching extracted term information by a garbage collection process.

Conveniently, step 130 comprising step 131 of receiving a request to update or create an alert criterion and processing the request by adding control data. Step 130 is followed by step 132 of filtering the request. Said filtering involves excluding said requests generated from predefined client systems. Step 130 is also followed by step 133 of parsing and stemming the alert criteria to generate alert terms and additional terms. Additional terms can define a relationship between alert terms, a weight factor associated to the alert terms, a similarity threshold and to indicate which client system are to receive an alert when said criteria is matched. Step 134 is followed by step 135 of processing the alert terms and additional information by adding relevant control information. Step 135 is followed by step 136 of filtering said alert terms and additional terms. Step 136 further comprising of at least one of the following steps: step 1361 of discarding said alert terms constructed of one-letter words; step 1362 of discarding said alert terms constructed of frequently used words; step 1363 of discarding said alert terms constructed of stop-words; and step 1364 of discarding said alert terms constructed of predefined words. Step 136 is followed by step 137 of storing said alert terms in a alert term index data structure for a period that is shorter than a predefined period of time or until an alert criteria removal request is received from a user.

Conveniently step 160 comprising step 161 of fetching each alert criterion that have an alert term that matches a matching extracted term that was received at step 110. Step 162 of checking each alert criterion to determine which portion of matching terms extracted information to fetch. Step 163 of fetching said portion and step 164 of processing said portion, in light of the alert criteria to determine whether to issue an alert.

Conveniently, step 164 is based upon at least one of the following parameters: (i) a total amount of extracted terms provided by an information source in a predefined time interval; (ii) an elapsed time since the extracted term was provided by the information source in said predefined time interval; and (iii) an extracted term position in the information source.

Conveniently, step 164 involves computing a similarity between an alert criteria and information indicating a reception of a group of information packets. The similarity reflects at least one of the following parameters: a total amounts of extracted terms being received from at least one information source during a predefined time interval; a number of matching extracted terms being received from at least one information source during the predefined time interval; a total number of information sources being searched during the predefined time interval; an elapsed time since a last appearance of a matching extracted term from an information source during the predefined time interval; a position of matching extracted terms in at least one information source; an extracted term in proximity to a matching extracted term; a part of speech of a matching extracted term; and a matching extracted term frequency and importance in a language of the information source. Said similarity can be compared to a predefined similarity threshold, in order to determine whether to send an alert to a client system. Preferably, the group of at least one information packet comprising of at least one information packet received from a single information source.

Step 170 comprising step 171 of determining to which client system to send an alert. Conveniently step 171 is followed by step 172 of determining a format of an alert to be sent to a client system, according to a predefined client system format and formatting the alert according to said client system format. Preferably, the predetermined client format selected from a group consisting of: HTML format; WAP format; PDA compatible format; Digital television compatible format; electronic mail format and multimedia stream format.

Preferably, an alert comprising of at least one field selected from a group consisting of: an information source identifier field, for identifying an information source that either provided a matching extracted packer or for identifying an information source that provided a received signal, whereas a portion of said received signal being represented in an information packet from which the extracted term was extracted; a link field, for allowing the client system to be linked to the information source or for allowing the client system to receive additional information from said information source; and an information source category identification, identifying a category of information source that provided the matching extracted term. Said additional information is selected from a group consisting of: a multimedia stream originated by said information source; a stream of information packets originated by said information source; a multimedia stream associated to the information packet from which the extracted term was extracted; a stream of information packets, comprising the extracted term.

Conveniently, a client system is configured to generate a unique information source category indication in response to a reception of said information source category identification and to generate a unique information source indication in response to a reception of said information source identification.

Search Module 26

The operation of search engine 26 is described at U.S. patent application titled "System and Method for Real Time Searching", Ser. No. 09/655,185, filed at Sep. 5, 2000 and assigned to eNow Inc., is incorporated in its entirely by reference.

Figure 4:
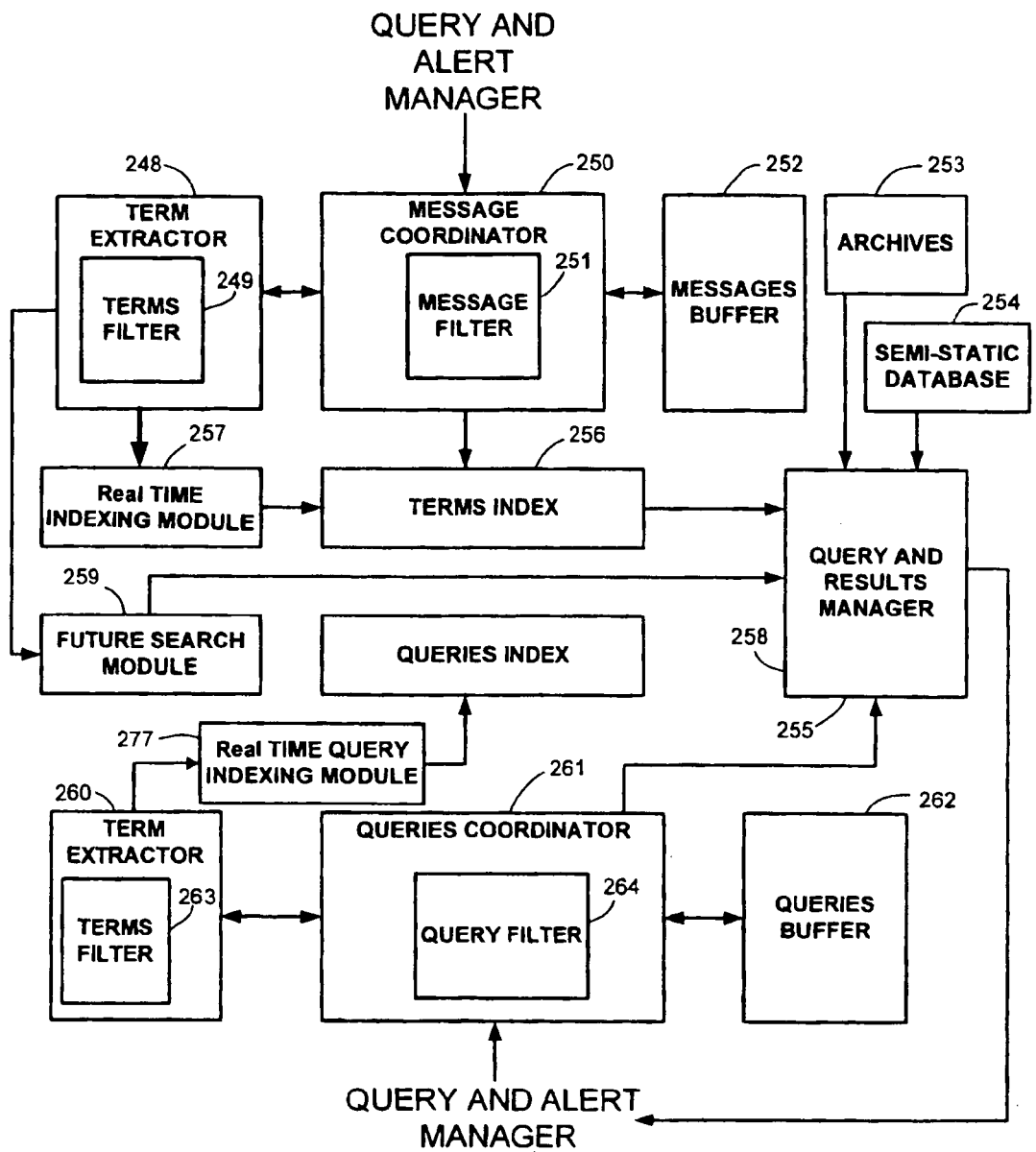
FIG. 4 is a simplified block diagram that illustrates a search engine operations in association with related modules and data structures, in accordance with a preferred embodiment of the present disclosure.

Referring now to FIG. 4 where the various software modules and data structures necessary for the operation of the Search Engine are shown. For clarity of the disclosure FIG. 4 does not illustrate some portions of the distribution means 4, retrieval means 6 and analysis means 5 of FIG. 1.

FIG. 4 illustrates various optional modules/portions of search engine 26, such as, but not limited to, query index 258, real time query indexing module 277, archive search module 253, semi-static database search module 254, query coordinator 261 query filter 264, message coordinator 250, message filter 251, terms filters 249 and 263. Search engine 26 has: Message Coordinator module 250, Message Filter module 251, Messages Buffer 252, Term Extractor modules 248 and 260 Terms Filter modules 249 and 263, Real Time Indexing module 257, Real Time Query Indexing module 277, Terms Index 256, future search module 259 for allowing a generation of alerts to a client system, queries Index 258, query and results manager 255 user communication modules 266, 268, and 270, queries coordinator 261, query filter module 264, archive search module 253, and semi-static database search module 254. Although no part of the Search Engine, for the clarity of the disclosure only, Users 265, 267, and 269 are shown connected to User Communication modules 266, 268, and 270. Query and results manager 255 matches query results to terms index 256 to generate query results. Query and results manager 255 matches alert criteria provided by future search module 259 to the content of terms index 256. Future search module also referred to as alert module 259. Although information packets will be referred to as messages, and information sources will be referred to as channels in the text of this document, it will be appreciated that in different embodiments of the present disclosure other sources of information could be used such as news channels, video channels, music channels, various Internet sites and the like. It will also be appreciated that in other embodiments of the present disclosure, the information packets processed could be in addition to text format in other diverse data formats such as streaming video, still pictures, sound, applets and the like.

The messages are received by Messages Coordinator Module 250 and are processed accordingly. The messages transferred consist of control data such as channel ID, Message ID, timestamp of the time of arrival, and information content such as a phrase, a sentence, a news item, a music item or a video item.

Messages Coordinator 250 coordinates the handling of the incoming messages, and provides processed messages to term extractor 248 and to messages buffer 252. Messages Buffer 252 is a data structure that temporarily holds the incoming messages. In the preferred embodiment of present disclosure Messages Buffer 252 is a cyclic buffer. Message Filter 251 filters messages according to user-defined rules. For example, messages with a specific channel ID or messages containing specific text might be blocked and discarded.

Term Extractor 248 receives the messages from Messages coordinator 250, performs message parsing, and stemming (finding the lexicographic root) of the resulting terms. Once the message is parsed and stemmed, a list of terms within said message is created. The terms extracted are sent to further processing accompanied with identifying data such as channel ID, message ID and the message arrival time. Terms Filter 249 passes the terms through a series of filters, which can change or discard specific terms. For example, Terms Filter 249 can discard stop-words, frequently used words, one-character words, user-defined words, system-defined words such as "a", "about", "else", "this", and the like. According to an aspect of the invention the frequently user words are utilized for determining the flow characteristics of incoming data.

Real Time Indexing Module 257 accepts and stores the terms into Terms Index 256. Real Time Indexing module 257 also schedules and initiates periodically a process that removes irrelevant or time-decayed terms from Terms Index 256. Description of the process will be set forth hereunder.

Terms Index 256 consists of indexed terms and message identifiers that point to information relating to a reception of said messages and indexed terms during a predetermined period of time. Terms Index 256 is designed to enable fast term indexing and deletion. The indexing is done per term, while deletion is done per message. When the message is discarded for becoming irrelevant or time-decayed, all terms that refer to this message are deleted from Terms Index 256. Terms Index 256 is a means to realize real time search of real time content that is one of the search capabilities of the Search Engine module.

Alert module 259 functions in conjunction with Queries Index 258. Unlike real time Indexing module 257, alert module 259 matches incoming terms from the message stream against a database of more or less static queries. Therefore, alert module 259 has the ability to search for a term that is relevant to a query that was initiated at some point in time in the past as long as the relevant query is kept in the Queries Index 258. Alert module 259 enables the return of query results during a predefined time frame that begins at the query's arrival time.

Queries Index 258 holds queries for a predefined time frame in order to provide the means to alert module 259 to match terms of queries against the terms of the incoming messages. Queries Index 258 enables to return future results to queries.

According to one preferred embodiment of the invention, queries are inserted into queries Index 258 by queries coordinator 61. According to another preferred embodiment of the invention said queries also pass query terms extractor 260 and real time query indexing module 260, and undergo preprocessing steps that are analogues to preprocessing steps of a massage. Queries can contain several terms. Therefore, the relevant control information associated with each query such as query ID, timestamp and the like is indexed against all the terms of the query.

Query and Results Manager module 255 handles the queries and provides return of results to the queries by establishing a unified result from all the result sources except from Future search module 259. Result sources are the following: (a) search in Real Time Indexing module 257, (b) search in the Semi-static database by semi-static database search module 254, and (c) search in the Archive database by archive search module 253.

Query and Results Manager module 255 is also operable to send the results of at least the search in real time indexing module 257 to relevancy determination unit 2.

The results from future search module 259 are passed through the Query and Results Manager 255 that sends the results on to the users 265, 267, and 269 via User communication modules 266, 268, and 270. Typically, a result consists of a sorted list of channel IDs and a score for each channel that mirrors a channel/query match. Dispatcher means are operable to transfer queries initiated by the users to the Search Engine module and return results back to the users.

When a complex search is performed, query and search manager 255 analyses information regarding a various receptions of information packet said information packets originating from a single information source.

Queries Coordinator 261 functioning similarly to Messages Coordinator 250 only with queries instead of messages. Queries Coordinator 261 receives queries from user communication modules 266, 268, and 270 and inserts the queries into the Queries Buffer 262. Upon a request from Query and Results Manager 255 Queries Coordinator 261 fetches one query from queries buffer 262 and passes it via Terms Filter 263 to Term Extractor 260. The extracted terms of the query are inserted by real time query indexing module 277 into Queries Index 258.

According to one preferred embodiment of the invention, queries Buffer 262 holds the queries in the same manner as the messages are held in the Messages Buffer 252. Queries Buffer 262 is a data structure that temporarily holds the incoming queries. In the preferred embodiment of present disclosure Queries Buffer 262 is a cyclic buffer.

According to another preferred embodiment of the invention said query buffer holds a plurality of alerts criteria, each alert criteria is stored in said buffer until a client that provided said alert criteria deletes said alert criteria.

Archive search module 253 acts on the archived data files of a channel by indexing the data and by returning results according to the indexed data. The archived data files through Archive search module 253 are a result source for the Query and Results Manager 255.

The Semi-static database search module 254 acts on the semi-static database that is an index, holding semi-static channel information such as channel ID, channel description, name, topic, and keywords. The database described "semi-static", as the information therein is structured (i.e.— said information is associated to information fields), is relatively small and changes infrequently. Semi-static database via semi-static database search module 254 is a result source for the Query and Results Manager 255.

It will be appreciated that other forms of search could be contemplated in other embodiments such as thesaurus-mode search or historical-mode search. Therefore, the above description should not be interpreted as a limitation to the present disclosure.

The operation of the Search Engine module will be described next. Information packets are extracted out of incoming information streams. The messages are structured, times-stamped and transferred to the operative modules of the Search Engine. The structured messages contain control data such as channel ID, message ID, time stamp indicative of the time of arrival and content information such as textual data. The messages transferred through Message Filter 251 which blocks specific messages according to predefined rules. For example, messages originating in particular channels or having specific text content or having particular characteristics could be discarded. The filtered messages are inserted into Messages Buffer 252 which is managed and synchronized by Messages Coordinator 250. Messages coordinator 250 operates in conjunction with Messages Buffer 252, which is designed to hold the messages to be retrieved for later processing. Messages Buffer 252 is a cyclic buffer. Incoming messages are inserted at one end of the Messages buffer 252 while retrieved from the other end. The messages are kept in the buffer for a predefined period of time. Time-decayed messages may be discarded. In other embodiments of the disclosure, other methods could be used to delete messages from Messages Buffer 252 such as deletion by predefined priorities. For example, messages from a specific low-priority channel could be discarded first. When a message is deleted from message buffer 252 information relating to the reception of extracted terms that were extracted from said messages are deleted from term index. Message coordinator 250 provides messages to Term Extractor 248. Term Extractor 248 performs message parsing, stemming (finding the lexicographic root) of the resulting tokens and extracts the tokens from the messages. The tokens are transferred through a series of Terms Filters 249. Terms Filters 249 can change or discard a token according to predefined parameters. For example, Terms Filters 249 can discard stop-words, one-letter words, frequently used words, user-predefined words and the like.

The tokens are structured into operative terms to be used by other Search Engine modules after Term Extractor 248 attaches identifiers to the tokens such as channel ID, message ID and time of arrival. Finally, Term Extractor 248 dispatches the terms to real-time Indexing module 257.

The purpose of Real-time Indexing module 257 is to provide a search capability of text received in the close past. Real Time Indexing module 257 receives the terms from Term Extractor 248 and stores the operative terms into Term Index 256 which is a dynamic data structure designed to cope with the requirement for fast indexing of terms and for fast deletion of all references to terms related to a specific message. In addition, real-time Indexing module 257 performs a periodic scan for non-used terms in Terms Index 256. Non-used terms are defined as terms that are not referenced for a predefined period of time. Periodically, a garbage collection process is initiated by real-time Indexing module 257 in order to delete the non-used terms.

The search-related element of Terms Index 256 is a data structure containing entries indexed by terms and holding the terms related information such ass a channel ID. As a result, fast insertion and indexing of terms is accomplished.

A more detailed description of the operations related to inserting terms and removing terms from Terms Index 256 will be set forth hereunder in association with the related drawing.

Users initiate queries. User communication modules 266, 268, and 270 transfer the queries from the user into the Search Engine modules. Queries hold one or more terms. Conveniently, the handling of a query by the Search Engine modules is analogues to the handling of an incoming message. Queries are filtered by Query Filter 264, and handled by Queries Coordinator 261. Queries Coordinator 61 functions in respect to the incoming queries in a like manner to Messages Coordinator 250 functions in respect to the incoming messages. Queries Coordinator 261 receives the queries from user communication modules 266, 268, and 270 and transfers the queries to the Term Extractor 260. Term Extractor 260 parses the queries and stems the resulting tokens. The tokens are filtered by a series of Terms Filters 63, structured into query-terms by the attachment of control information such as query Id and time-stamp and returned to Queries Coordinator 261 to be inserted into Queries Index 258 in order to be matched later against the operative terms in Terms index 256.

Queries Index 258 holds query-terms for a predefined period of time to enable queries to be matched against the stream of incoming message terms. Queries index 258 thus provides the capability to collect future results to queries. The above mentioned capability is accomplished in conjunction with the Future Search module 259.

Future Search module 259 operates in conjunction with the Queries Index 258 by matching terms from incoming stream of messages against a database of relatively static queries. Said data base can hold alert criteria, and system 1 can dispatch an alert to a client system when an alert criteria is matched. Subsequently a query that was initiated in the past can be matched against newly inserted terms as long as the query is kept in the Queries Index 258. This type of search is defined as the "future search mode" in contrast to the "real-time search-mode".

Scoring, or ranking of channels to be returned as a result, is done using a model that computes the similarity between the query and the channel. Some of the parameters involved in computing the results are: Total amounts of terms in channel in the predefined time interval, number of relevant terms in the channel in the predefined time interval, total number of channels searched in the predefined time interval, elapsed time since the last appearance of the relevant term in the channel in the predefined time interval and relevant terms position in the channel. Additional factors for the score: terms in proximity to relevant term, part of speech of relevant terms, relevant term frequency and importance in the language of the channel.

The parameters enable Query and Results Manager 255 to rank the resulting channels, in addition to standard ranking methods by the time parameter as well by giving more weight to phrases than to the collection of single words.

Figure 5:
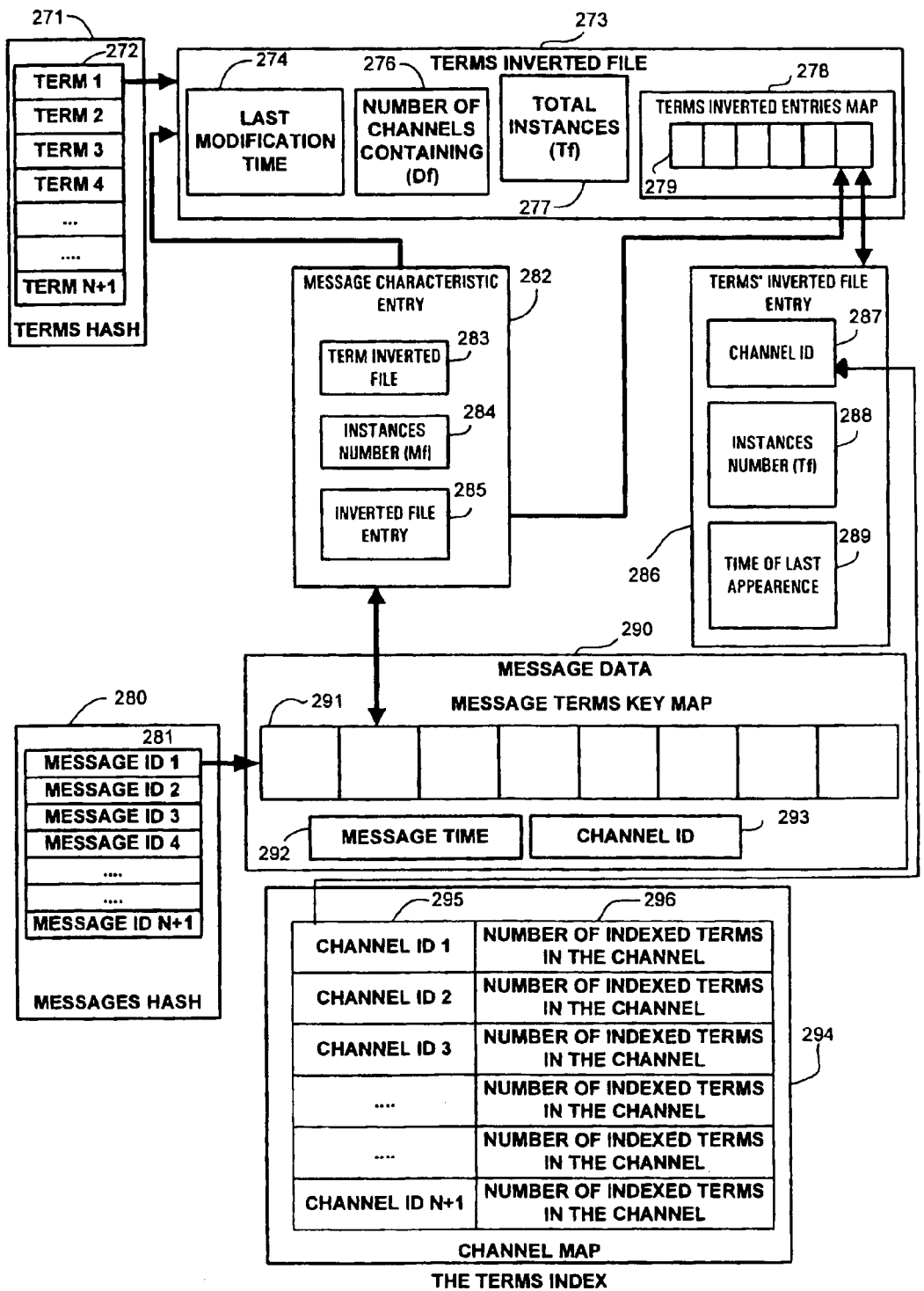
FIG. 5 is a simplified block diagram that illustrates the structure of the terms index tables, in accordance with a preferred embodiment of the present disclosure.

Referring now to FIG. 5 that illustrates the structure of the Terms Index 256 tables. The Terms Index consists of two main units: The Terms Hash 271 and the Messages Hash 280. Additionally Terms Index contains the Channel Map unit 294.

Terms Hash 271 comprises the Term table 272 and the associated Terms Inverted File 273. The Term Hash 271 comprises of entries whose keys are terms. Therefore, Term Hash 271 provides fast access to the entries by using terms as access keys. The said structure also provides for fast insertion of terms into the table.

The Terms Inverted File 273 comprises of a sorted list of Terms Inverted Entries Map 278 and at least one of the following files: (a) a total number of references (Total Instances) 277 to the term in all the messages currently stored in Messages Buffer 252 of FIG. 2, (b) the modification time of the term (Last Modification Time) 274, or (c) a number of channels that contain the term 276. Each entry, such as entry 786 in Terms Inverted Entries Map 278 is keyed by the channel ID 287 and has the number of references (Instances No) 288 to the term in that channel and the time of the last appearance of the term in the channel (Time of Last Appearance) 289. The number of references that are added to the Total Instances 277 could be used to determine the channel's relevance to a specific query.

Messages Hash 280 indexed by Message ID 281 in order to provide fast deletion of term's references by message. Messages Hash 280 comprises Message ID table 281 and the associated Message Data table 290. Each entry in Message Data table 290 contains information about one message and pointed to by a Message Hash entry 281. Message Data table 290 consists of (a) the channel ID 293 (b) message time 292, and (c) Message Terms Keyed Map 291. The Message Terms Keyed Map 291 is a sorted list of Message Characteristics Entries 282. A pointer 283 keys each entry, which is unique to each term. Therefore, a Message Characteristics Entry 282 can be found easily by a specific term. Message Characteristics Entry 282 contains the following information: (a) the number of times the related term was referred to in the relevant message (Instances No) 284, and (b) a pointer to the related Inverted File Entry 285.

The Channel Map 294 is a list sorted by channel IDs 295. For each channel ID 295, Channel Map 294 holds the total number of currently indexed terms that belong to the channel 296. In the preferred embodiment of the present disclosure, said total number relates to the number of terms after filtering. In a different embodiment of the present disclosure, the total number could relate to the number of terms before filtering or to the average of both values.

The operations supported by the Terms Index 256 of FIG. 4 will be described next. Terms Index 256 of FIG. 4 supports three modes of operation: (1) term insertion, (2) terms deletion by message ID, and (3) term deletion by the garbage collection process.

Term insertion is performed by Term Extractor 248 of FIG. 4 when handling a newly extracted term from an incoming message. The term is indexed in this mode of operation by Term, Message Id, Channel Id and Message Time. When inserting a Term the following sequence of steps is performed:

The Term 272 to Terms Inverted File 273 link is accessed or created. A pointer to Terms Inverted File (invertedFilePtr) is saved.

The Total Instances 277 member's value in Terms Inverted File 273 pointed at by invertedFilePtr is increased by one.

The Last Modification Time 274 member in Terms Inverted File 273 pointed at by invertedFilePtr is updated.

The entry for channel Id 287 in Terms Inverted Entries Map 279 is accessed or created. A pointer to the entry is saved as invertedFileEntryPtr.

The value of Instances No 288 member in the entry pointed at by invertedFileEntryPtr is increased by one.

The appropriate Message Data is accessed or created in Message Hash 280. A pointer to the entry is saved as messageData.

The Message Characteristic Entry 282 in Message Data 90/Message Terms Keyed Map 291 is accessed by invertedFilePtr or created. A pointer to the entry is saved as messagecharac.

In the entry pointed at by messagecharac the value of Instances Number 284 member is increased by one.

In the entry pointed at by messagecharac, the invertedFileEntry pointer is set to point at invertedFileEntryPtr.

In the Message Data 290, the Message Time 292 member is updated.

In the Message Data 290 the channel ID 293 member is updated.

Term deletion by Message Id occurs when a message is deleted. A message can be deleted when the Messages Buffer 252 of FIG. 4 is full or a predetermined time interval indicative of the period a message should be kept in the buffer 252 has been completed. For term deletion by Message Id the following sequence of steps is performed:

The appropriate Message Terms Keyed Map 291 is obtained from Messages Hash 280.

For each Message Characteristics Entry 282 that points to Terms Inverted File 273:

The pointed terms Inverted File 273 is accessed and Total Instances 277 member's value is decreased by the Instances No 284 member's value in Message Characteristic Entry 282.

The Term Inverted Entry 286 is accessed and the Instance Number 288 value is decreased by Message Characteristic Entry's local instances No member 284 value.

Message Characteristic Entry 282 is deleted.

Steps 'c' through 'e' are repeated until Message Terms Keyed Map 291 is empty.

The Message Id 281/Message Terms Keyed Map 291 link is deleted. Deleting a term not via Message Id 281 is done periodically by the garbage collecting process. The deletion is performed if the term's last modification time occurred before a specific point in time in the past which implies that there are currently no messages that the specific term refers to or that the term's Total Instances 277 member's value equals zero. When a term is found that satisfies the above conditions a simple deletion of the Term 272 to Terms Inverted File 273 link is performed.

Conveniently, system 1 can provide alert by various manners. According to a first embodiment of the invention, future search module 259 matches a plurality of alert criteria against the content of terms index 256. According to a second embodiment of the invention, terms index 256 has additional field, associated to each term, indicating whether said term is a part of an alert criteria or not. If so—said term is not deleted from terms hash 71 unless a client system requested to delete it. When a real time search is performed, the whole content of the terms hash is checked, while an alert is based upon a check of only the terms identified as a part of the alert criteria.

Figure 9:
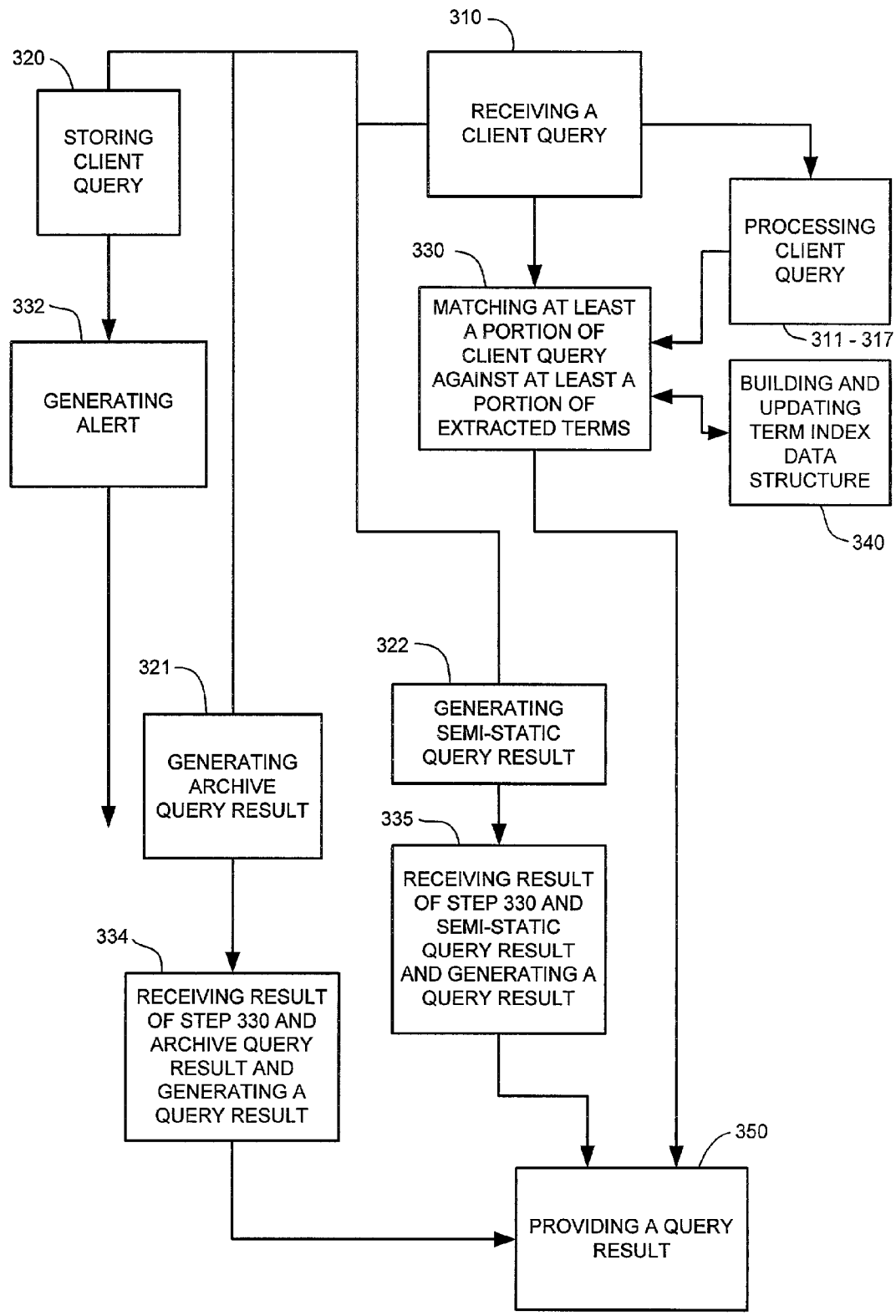
FIGS. 9-10 are flow charts illustrating a method for real time search, in accordance with a preferred embodiment of the invention.
Figure 10:
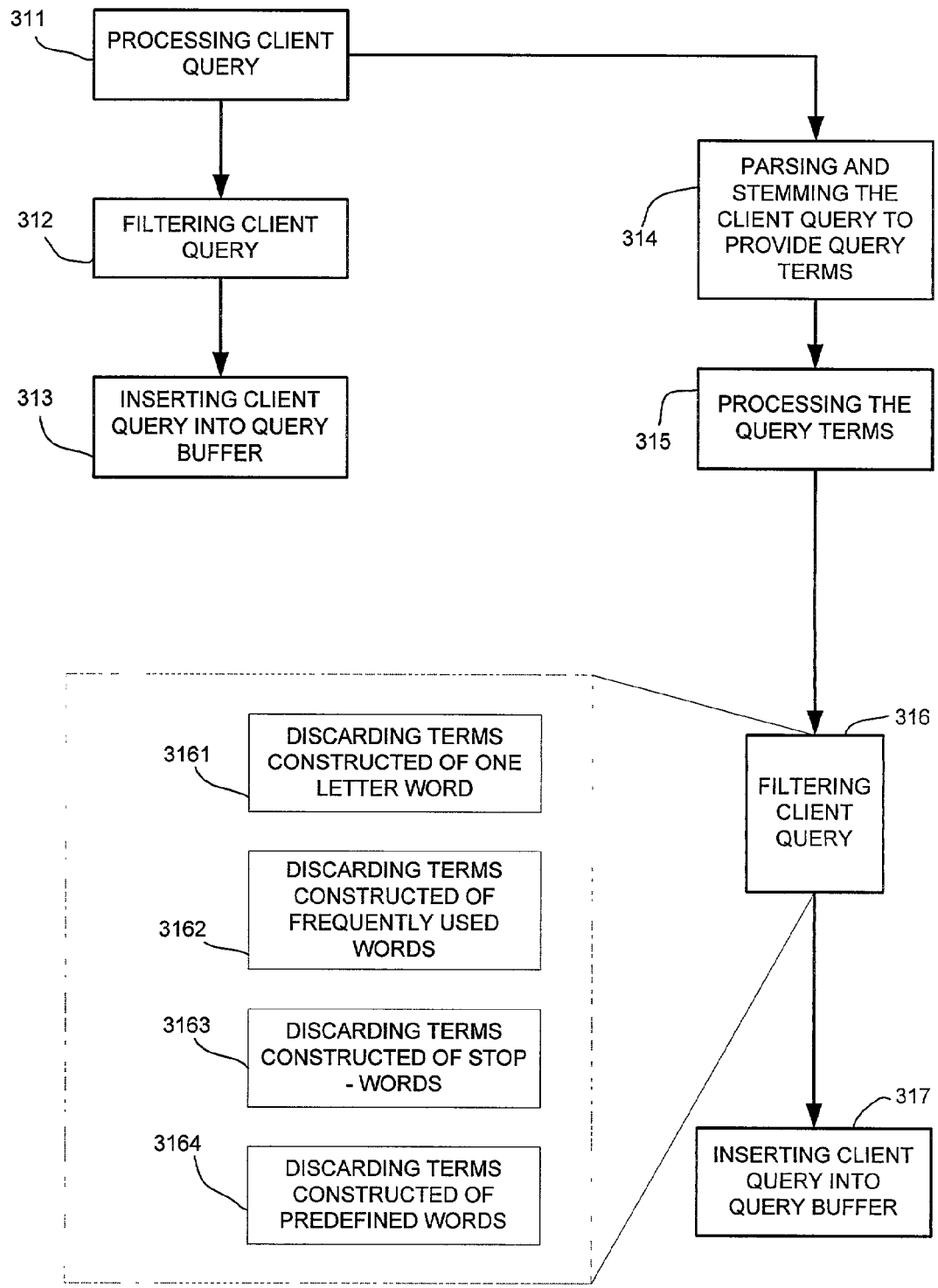

Referring to FIGS. 9-10 illustrating a method 300 for real time search, method 300 comprising steps 310, 330 and 350 and additional optional steps. Method 300 starts at step 310 of receiving a client query said client query regards a content of at least one information packet. Step 331 is followed by step 330.

Step 330 of matching at least a portion of said client query against at least a portion of a plurality of extracted terms to generate a query result, said extracted terms being extracted out of a plurality of information packets provided from a plurality of information sources, said extracted terms are stored in a storage means for up to a predetermined period of time. Conveniently, the storage means is a term index data structure. According to an aspect of the invention the results are also provided to relevancy determination unit.

Conveniently, step 330 is preceded by step 340 of building and updating the term index data structure. The term index data structure may include relevancy keywords and thus relevancy determination unit may know its content.

Step 340 comprising of at least one of the following steps: Step 341 of processing the plurality of information packets by adding control data to said information packets. The control data comprising of information packet identification, information source identification and time of arrival. Step 342 of filtering the plurality of information packets. Step 343 of parsing and stemming the plurality of information packets. Step 344 of processing said extracted terms by adding control information to said extracted terms. Step 345 of filtering the extracted terms to generate filtered extracted terms. Preferably, step 345 further comprising at least one of the following steps: step 3161 of discarding said terms constructed of one-letter words; step 3162 of discarding said terms constructed of frequently used words; step 3163 of discarding said terms constructed of stop-words and step 3164 of discarding said terms constructed of predefined words.

Step 346 of storing an extracted term in a term index data structure. Step 346 is preferably comprising following steps: inserting the extracted term into a terms hash table and into a terms inverted file; increasing a value of total instances in said terms inverted file; updating a value of last modification time in said terms inverted file; inserting an information source identification, said information source provided the extracted term, to a terms inverted entry map table in said terms inverted file; increasing a value of instances number in said inverted entry map table associated with said information source identification in said terms inverted file; inserting information packet data in a messages hash table; inserting the extracted term from said information packet to a messages data table; increasing a value of instances in said messages data table by one; updating a value of message time in said messages data table; and updating a value of information source identification in said message data table. It is noted that some of these steps are illustrated at FIG. 8.

Step 346 is followed by step 347 of deleting the extracted term from the terms index data structure. Said deletion occurs either after a message from which said term was expired is stored in the message buffer for a predetermined period of time. Said term can also be deleted as a result of a garbage collection process, said process is based upon a deletion of terms that are not mentioned during a certain period.

Preferably, step 347 comprising the steps of: receiving an information packet identification, whereas the terms extracted from the information packets are to be deleted; reading the information packet identification from the messages hash table in said terms index data structure; obtaining relevant entries of said extracted terms belonging to said information packet in said messages data; accessing said terms inverted file for each said terms entry pointed to said terms inverted file; and decreasing a value of said total instances by a value of said instances number for each said terms entry pointed to said terms inverted file. Step 347 further comprises a step of deleting an extracted term by a garbage collection process and canceling a link between said term in said terms hash table and said terms inverted file is canceled. It is noted that some of these steps are illustrated at FIG. 8.

Conveniently, step 310 is followed by step 311 of processing the client query by adding control data to said client query. Step 310 is followed by step 312 of filtering the client query. Said filtering involves excluding said information packets generated from predefined client systems. Step 310 is also followed by step 314 of parsing and stemming the client query to generate query terms. Step 314 is followed by step 315 of processing the query terms by adding relevant control information to the query-terms. Step 315 is followed by step 316 of filtering said query terms. Step 316 further comprising of at least one of the following steps: step 3161 of discarding said terms constructed of one-letter words; step 3162 of discarding said terms constructed of frequently used words; step 3163 of discarding said terms constructed of stop-words; and step 3164 of discarding said terms constructed of predefined words. Step 316 is followed by step 317 of storing said query terms in a term index data structure for a period that is shorter than a predefined period of time or until a query removal request is received from a user.

Conveniently, method 300 allows performing more than a single search Mode In addition to a first mode in which an incoming client query is matched against a content of the storage means, method 300 comprises of steps 320, 321 and 322 for allowing additional search modes. When more than a single search mode is selected, results of some search modes are unified to provide a single search result.

A path comprising of steps 320 and 332 allows providing alerts. Said path starts by step 320 of storing client queries follows step 310. Conveniently, step 320 comprising of a step of updating query index 58. Step 320 is followed by steps 332 of matching client queries/alert criteria received and processed in the past against newly received terms to generate an alert.

Step 321 of matching the client query against historical archives of informational content to generate an archive query result is followed by step 334 of processing the archive query result and a result of the step 330 to generate the query result.

Step 322 of matching the client query against a semi-static database of said informational content and having a low incidence of changing to generate a semi static query result, is followed by step 335 of matching the client query against the semi-static database is followed by a step of processing the semi static query result and a result of the step of matching at least a portion of said client query against at least a portion of a plurality of extracted terms to generate the query result.

Conveniently, a query result comprises of at least one information source, said at least information source provided a matching information packet. Step 330 further comprises a step 336 of ranking information sources according to a similarity between at least a portion of information packets provided by said information sources and between the client query. Preferably, said ranking process is based upon at least one of the following parameters: (a) a total amount of extracted terms provided by an information source in a predefined time interval; (b) an elapsed time since the extracted term was provided by the information source in said predefined time interval; and (c) an extracted term position in the information source.

Relevancy Calculation

Figure 11:
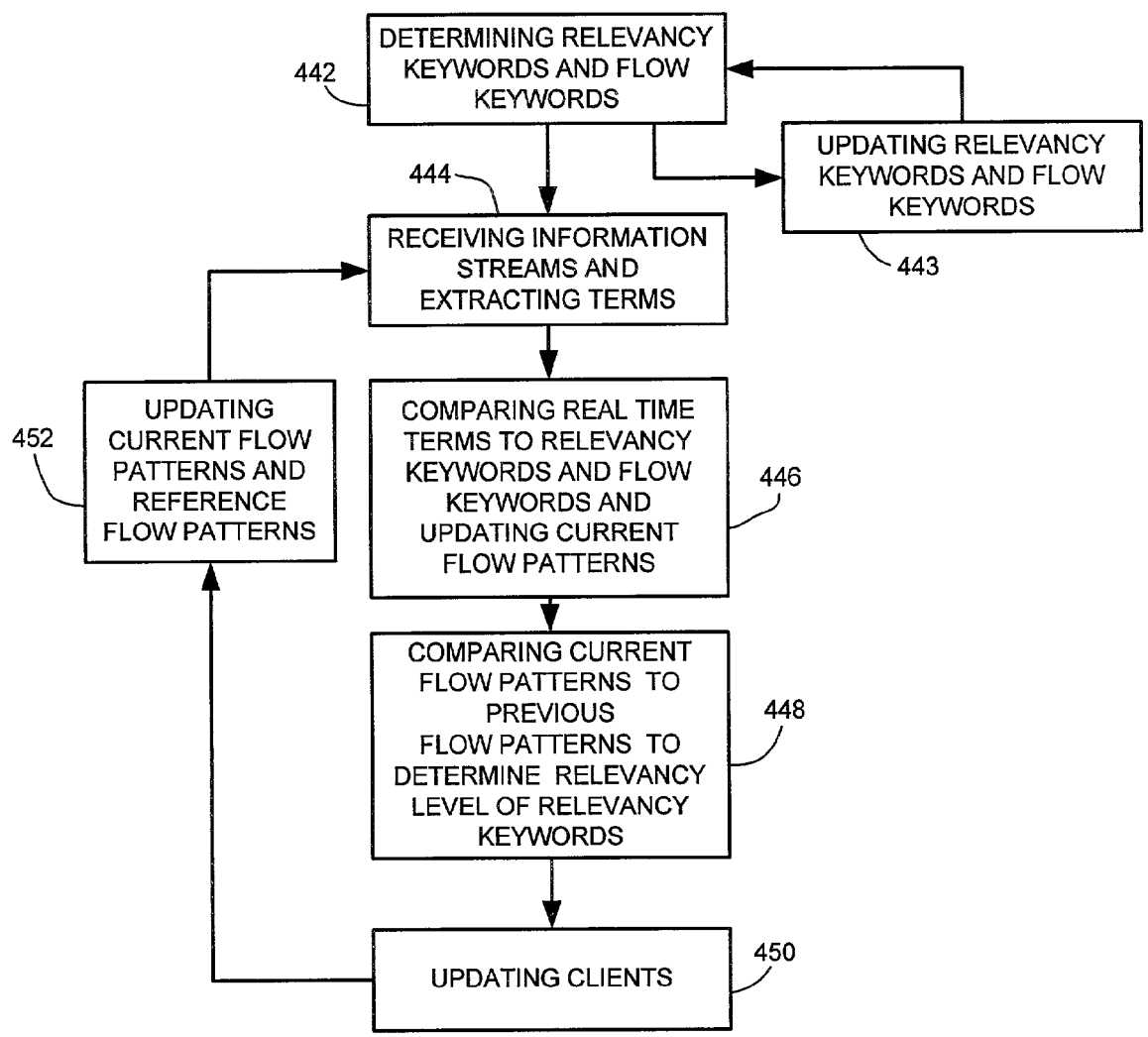
FIG. 11 is a flow chart illustrating a method for determining a relevancy of a keyword, in accordance with a preferred embodiment of the invention.

Referring to FIG. 11 illustrative of a method 440 of determining a relevancy of a keyword, in accordance with a preferred embodiment of the invention.

Method 440 starts by step 442. According to a first aspect of the invention step 442 includes determining relevancy keywords. According to a second aspect of the invention step 442 further comprising determining flow keywords or determining a manner in which incoming data stream flows are measured or estimated. According to a third aspect of the invention step 442 further includes determining weight factors to be associated with information sources that provide the received data streams from which real time terms are extracted. For convenience of explanation it is assumed that step 442 includes determining flow keywords and relevancy keywords, but as mentioned above this is not necessarily so.

Step 442 is followed by step 444 of receiving information streams and extracting real time terms.

Step 444 is followed by step 446 of comparing the real time terms to the relevancy keywords and (according to the first aspect of the invention) to the flow keywords and accordingly updating current reception pattern for each received relevancy keyword, in response to the reception of the relevancy keyword and overall reception of flow keywords. It is noted that each received real time term is associated with a timing information. The timing information may be processed in response to time zone information, but this is not necessarily so. If is further noted that each extracted term may be associated with an indication of its origin, and that origin may be associated with a weight factor.

Step 446 is followed by step 448 of comparing current reception pattern to previous reception pattern of each relevancy keyword that was received during the test period and in response determining the relevancy level of each of the received relevancy keywords. It is noted that the comparison may take into account the origin of the extracted terms.

Step 448 is followed by step 450 of updating client, in response to relevancy keyword statistics. The update may reflect the most relevant keywords out of data streams that are provided by system 1 to the clients.

Relevancy keywords and flow keywords may be updated, even during the execution of other steps of method 440, as illustrated by step 443 of updating relevancy keywords and flow keywords (according to a first aspect of the invention). Step 443 is preceded by step 442 and is followed by step 442.

Current reception pattern includes information reflecting a reception of relevancy keywords during the test period. Conveniently, the test period is of a predefined length (such as the last 12 or last 24 hours). Whenever an event of receiving a relevancy keyword or a flow keyword exits the test period the event may be utilized for calculating previous reception pattern. Accordingly, step 450 is followed by step 452 of updating current reception pattern and previous reception pattern. Step 452 is followed by step 444.

Figure 12:
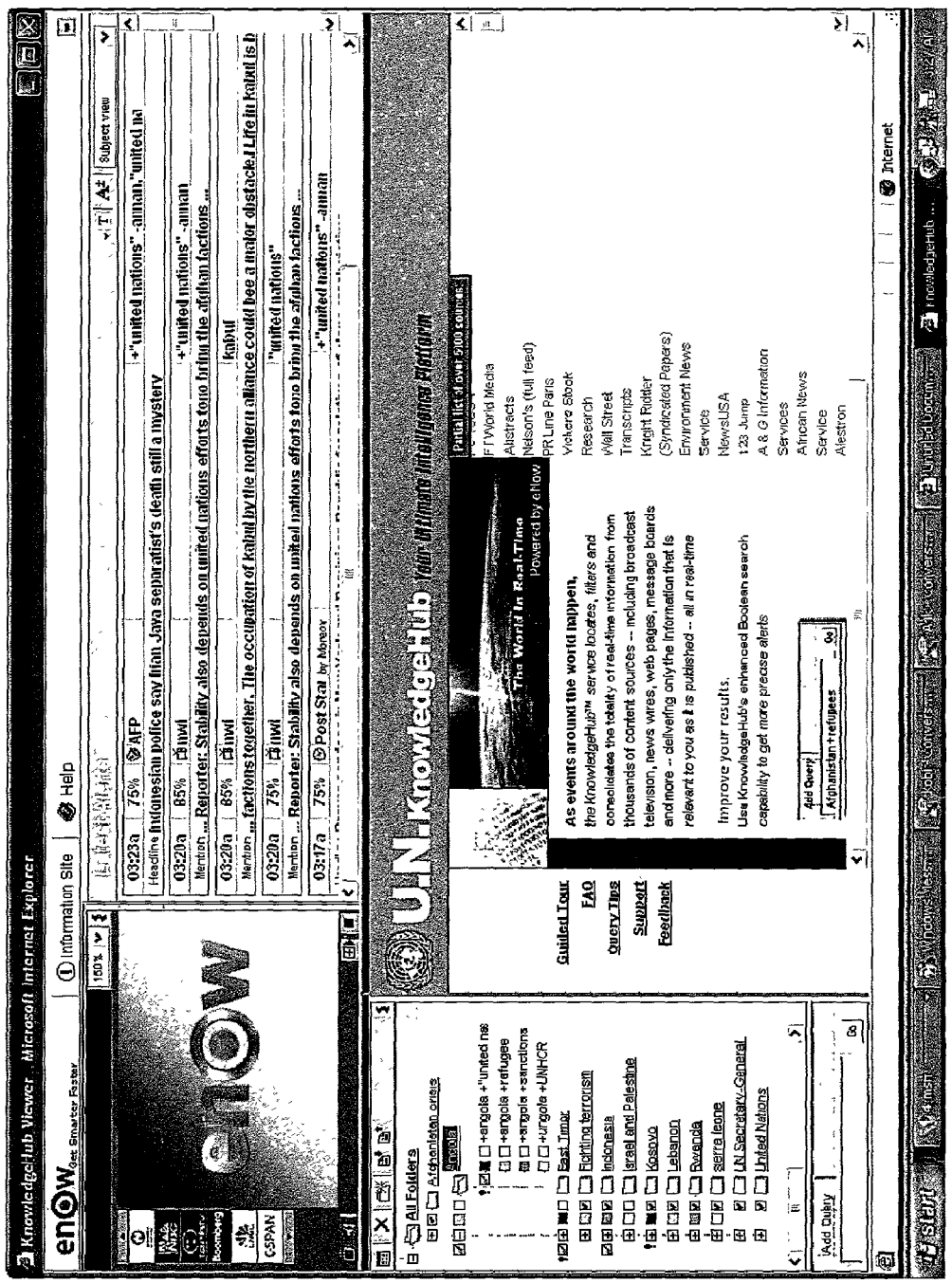
FIG. 12 illustrates a media screen illustrating relevancy values of relevancy keywords, in accordance with a preferred embodiment of the invention.

Referring to FIG. 12 illustrating a screen in which relevant keywords are painted according to their relevancy level. The relevancy keywords are arranged in a folder like manner and the folder title is painted in accordance with the most relevant relevancy keyword.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather then the foregoing detailed description.

We claim:

1. A relevancy determination unit comprising:
a first interface adapted to receive and receives information relating to a reception of a keyword;
a processor adapted to calculate and calculates a current reception pattern and a previous reception pattern in response to the reception of information relating to the reception of the keyword and to attach and attaches a relevancy level to the keyword, wherein the relevancy level is defined by a relevancy level threshold; and
a storage unit, coupled to the first interface and the processor, adapted to store and stores the current reception pattern, the previous reception pattern and information relating to the reception of the keyword,
wherein the relevancy determination unit is adapted to determine and determines the relevancy of the keyword.

2. The relevancy determination unit of claim 1 wherein the processor is operable to determine and determines the relevancy of the keyword in response to a comparison between the current reception pattern and a reference reception pattern.

3. The relevancy determination unit of claim 1 further adapted to receive and receives a keyword extracted from a client query.

4. The relevancy determination unit of claim 1 wherein the first interface is coupled to a search engine to receive and receives a term extracted from a client query.

5. The relevancy determination unit of claim 1 further adapted to receive and receives a keyword extracted from an alert criterion.

6. The relevancy determination unit of claim 1 wherein the first interface is coupled to an alert module to receive and receives a term extracted from an alert criterion.

7. The relevancy determination unit of claim 1 further operable to update and updates at least one client as to the relevancy of the keyword.

8. The relevancy determination unit of claim 1 wherein the processor is further adapted to estimate and estimates a flow patterns of a received information stream.

9. The relevancy determination unit of claim 1 wherein the processor is further adapted to monitor and monitors a reception of the flow keyword.

10. The relevancy determination unit of claim 9 wherein the flow keyword comprises a commonly used word.

11. The relevancy determination unit of claim 8 wherein the information stream comprises content selected from the group consisting of text, audio, video, multimedia, and executable code streaming media.

12. The relevancy determination unit of claim 1 wherein the current reception pattern of the keyword is further responsive to the estimated flow pattern of a received information stream.

13. The relevancy determination unit of claim 1 further configured to compensate and compensates for time differences resulting from a reception of an information stream from a distinct geographical location.

14. The relevancy determination unit of claim 1 further adapted to be coupled and is coupled to a time zone unit to compensate for time differences resulting from a reception of an information stream from a distinct geographical location.

15. The relevancy determination unit of claim 1 further configured to compensate and compensates for time differences resulting from a reception of an information stream relating to an event that occurs at a distinct geographical location.

16. The relevancy determination unit of claim 1 further adapted to be coupled and is coupled to a time zone unit to compensate for time differences resulting from a reception of an information stream relating to an event that occurs at a distinct geographical location.

17. The relevancy determination unit of claim 1 wherein the current reception pattern reflects the reception of the keyword during a test period.

18. The relevancy determination unit of claim 1 wherein the current reception pattern reflects the reception of the keyword during at least two test periods.

19. The relevancy determination unit of claim 18 wherein the at least two test periods at least partially overlap.

20. The relevancy determination unit of claim 18 wherein each of the at least two test periods is characterized by a corresponding current reception pattern.

21. The relevancy determination unit of claim 20 further adapted to compare and compares between each corresponding current reception pattern and the reference reception pattern.

22. The relevancy determination unit of claim 21 further adapted to determine and determines relevancy responsive to a combination of the at least one comparison.

23. The relevancy determination unit of claim 18 wherein the reference reception pattern reflects the reception of the keyword during a time period that is much longer than each of the test periods.

24. A system for receiving and processing a real time term, the system comprising:
a search engine, adapted to receive and process and receives and processes an information stream and/or an information packet and to provide and provides an indication reflecting at least one match between a query provided by a client and a real time term extracted from the information stream and/or information packet;
a relevancy determination unit, coupled to the search engine, adapted to receive and receives the indication and to determine and determines whether the real time term matches keyword; and
at least one module selected from the group of modules consisting of:
a message coordinator module adapted to coordinate and coordinates a handling of a plurality of information packets,
a message buffer adapted to temporarily hold and temporarily holds the plurality of information packets,
a message filter module adapted to filter and filters a plurality of information packets according to predefined rules,
a term extractor module adapted to parse and stem and parses and stems a plurality of information packets.
a terms filter adapted to exclude and excludes a real time term according to predefined rules,
a queries coordinator module adapted to coordinate and coordinates the processing of a client query,
a query-term extractor adapted to parse and stem and parses and stems an incoming query to extract and process and extracts and processes an operative query-term, and
a query-term filter adapted to exclude and excludes a specific query-term in a predefined manner,
wherein the relevancy determination unit comprises: a first interface adapted to receive and receives information relating to a reception of the keyword; a processor adapted to calculate and calculates a current reception pattern and a previous reception pattern in response to the reception of information relating to the reception of the keyword and to attach and attaches a relevancy level to the keyword; and a storage unit, coupled to the first interface and the processor, adapted to store and stores the current reception pattern, the previous reception pattern and information relating to the reception of the keyword,
wherein the system is adapted to receive and process and receives and processes the real time term.

25. The system of claim 24 wherein the storage unit is a term index data structure.

26. The system of claim 25 wherein the term index data structure is adapted to hold and holds an indexed real time term and an information packet identifier.

27. The system of claim 26 wherein the term index data structure further comprises:
a terms hash table holding extracted, filtered and processed terms;
a terms inverted file pointed to by said terms hash table that holds a terms inverted entry map;
a messages hash table holding an information packet identification;
a messages data table holding an information packet data; and
a channel map holding a list of information sources and a related number of index terms of said information sources.

28. The system of claim 27 wherein the terms inverted file further comprises:
a terms inverted entries map table;
a total instances of said term;
a number of information sources containing said term; and
a last modification time of said term.

29. The system of claim 28 further comprising:
a message terms key map;
an information source identification; and
an information packet time of arrival.

30. The system of claim 29 wherein the message terms key map further comprises:
a pointer to said terms inverted file;
an instances number of said term in said information packet; and
a pointer to said inverted file entry related to said term.

31. The system of claim 30 wherein the terms inverted entries map further comprises:
an information source identification;
an instances number of said term in said information source; and
a time of last appearance of said term in said information source.

32. The system of claim 24 further comprising at least one of the following means:
an adding means adding control data to said information packet;

a filtering means filtering a plurality of information packets;

a processing means for said real time term adding control information to said real time term; and a term filtering means for the real time terms generating a filtered real time term.

33. The system of claim 32 wherein the search engine is adapted to extract and extracts a real time term out of the plurality of information packets by parsing and stemming the plurality of information packets; and wherein the term filtering means is adapted to (a) discard and discards said term constructed of a one-letter word; (b) discard and discards said term constructed of a frequently used word; (c) discard and discards said term constructed of a stop-word; and (d) discard and discards said terms constructed of a predefined word.

34. The system of claim 33 wherein the control data comprises an information packet identification, an information source identification and a time of arrival.

35. The system of claim 24 further adapted to receive and receives an information packet, to store and stores the information packet with an associated packet identifier in an information packet storage means, to store and stores real time term information representative of a reception of at least one real time term extracted from the information packet and to link and links between the stored information packet and the real time term information.

36. The system of claim 35 further adapted to delete and deletes an information packet and to delete and deletes the linked real time term information.

37. The system of claim 35 further adapted to store and stores the information packet in a messages hash, and the linked real time term information in a terms hash.

38. The system of claim 35 wherein the real time term information comprises at least one information field selected from the group consisting of:

a last modification time field, indicating a most recent time in which the real time term was received;

a number of channels containing term field, indicating a number of information sources that provided the real time term;

a total instances field, indicating a number of times the real time term was provided; and a terms inverted entries map, comprising a plurality of terms inverted file entries, each entry holds information representative of a reception of the real time term from a single information source.

39. The system of claim 38 wherein each inverted file entry comprises at least one field selected from the group consisting of:

a channel identifier, identifying the information source that provided the real time term;

an instances number, indicating a number of times the real time term was provided by the information source; and a time of last appearance, indicating a most recent time in which the real time term was received from an information source.

40. The system of claim 38 further adapted to associate and associates each information packet to a message terms key map comprising a plurality of message characteristic entries, each message characteristic entry associated to a real time term extracted from the information packet, said message characteristic entry comprising at least one field selected from the group consisting of:

a term inverted file, pointing to the term extracted information;

an instance number, indicating a number of times said real time term appeared in the information packet; and an inverted file entry, pointing to a terms inverted file entry.

41. The system of claim 24 further adapted to insert and inserts a real time term into a terms hash table and into a terms inverted file; to insert and inserts an information source identification to a terms inverted entry map table in said terms inverted file, said information source having provided the real time term; to insert and inserts information packet data in a messages hash table; to insert and inserts the real time term from said information packet to a messages data table; to increase and increases a value of instances in said messages data table by one; and to update and updates a value of the information source identification in said message data table.

42. The system of claim 41 further adapted to extract and extracts a real time term and to perform and performs at least one operation selected from the group consisting of:

increase a value of total instances in said terms inverted file;

update a value of last modification time in said terms inverted file;

increase a value of instances number in said inverted entry map table associated with said information source identification in said terms inverted file; and update a value of message time in said messages data table.

43. The system of claim 24 further adapted to delete and deletes an information packet, and to perform and performs at least one operation selected from the group consisting of receive an information packet identification, whereas the terms extracted from the information packets are to be deleted;

read an information packet identification from a messages hash table in a terms index data structure;

obtain a relevant entry of said real time terms belonging to said information packet in a messages data table; and access a term inverted file for each terms entry pointed to said terms inverted file.

44. The system of claim 24 further comprising an alert module to match and matches between an alert term and the real time term.

45. A system for receiving and processing a real time term, the system comprising:

an alert module, adapted to receive and process and receives and processes an information stream and/or information packet and to provide and provides an indication reflecting at least one match between at least one alert criterion provided by a client and real time terms extracted from the information stream and/or information packet; and a relevancy determination unit, coupled to the alert module, adapted to receive and receives the indication and to determine and determines whether the real time term matches a keyword, wherein the relevancy determination unit comprises: a first interface adapted to receive and receives information relating to a reception of a keyword; a processor adapted to calculate and calculates a current reception pattern and a previous reception pattern in response to the reception of information relating to the reception of the keyword and to attach and attaches a relevancy level to the keyword, wherein the relevancy level is defined by a relevancy level threshold; and a storage unit, coupled to the first interface and the processor, adapted to store and stores the current reception pattern, the previous reception pattern and information relating to the reception of the keyword, wherein the system is adapted to receive and process and receives and processes the real time term.

46. A computer implemented method for determining relevancy of real time received terms, the method comprising:

providing a system to receive and process a real time term, the system comprising:
a search engine, adapted to receive and process and receives and processes an information stream and/or an information packet and to provide and provides an indication that reflects at least one match between a query provided by a client and a real time term extracted from the information stream and/or the information packet;
a relevancy determination unit, coupled to the search engine, adapted to receive and receives the indication and to determine and determines whether the real time term matches a keyword; and
at least one module selected from the group of modules consisting of:
a message coordinator module adapted to coordinate and coordinates a handling of a plurality of information packets,
a message buffer adapted to temporarily hold and temporarily holds the plurality of information packets,
a message filter module adapted to filter and filters a plurality of information packets according to predefined rules,
a term extractor module adapted to parse and stem and parses and stems a plurality of information packets,
a terms filter adapted to exclude and excludes a real time term according to predefined rules,
a queries coordinator module adapted to coordinate and coordinates the processing of a client query,
a query-term extractor adapted to parse and stem and parses and stems an incoming query to extract and process and extracts and processes an operative query-term, and
a query-term filter adapted to exclude and excludes a specific query-term in a predefined manner,
wherein the relevancy determination unit comprises: a first interface adapted to receive and receives information relating to a reception of the keyword; a processor adapted to calculate and calculates a current reception pattern and a previous reception pattern in response to the reception of information relating to the reception of the keyword and to attach and attaches a relevancy level to the keyword; a storage unit, coupled to the first interface and the processor, adapted to store and stores the current reception pattern, the previous reception pattern and the information relating to the reception of the keyword; and
utilizing said system to:
determine the keyword,
extract the real time term from a currently received information stream,
update the current reception patterns of the keyword in response to a comparison between the extracted real time term and the keyword, and
determine a relevancy of the keyword in response to the comparison between the current reception pattern and a reference reception pattern.

47. The method of claim 46 wherein the keyword is extracted from an alert criterion of a client.

48. The method of claim 47 wherein the information packet comprises content selected from the group consisting of text, audio, video, multimedia, and executable code streaming media.

49. The method of claim 46 wherein the keyword is extracted from a client query.

50. The method of claim 46 further comprising updating at least one client as to the relevancy of the keyword.

51. The method of claim 46 further comprising estimating a flow pattern of the received information stream to generate an estimated flow pattern.

52. The method of claim 51 wherein the current reception pattern of the keyword is further responsive to the estimated flow pattern of the received information stream.

53. The method of claim 51 wherein estimating the flow pattern comprises monitoring the reception of a flow keyword.

54. The method of claim 53 wherein the flow keyword comprises a commonly used word.

55. The method of claim 46 further comprising storing the real time term in a storage unit for a predetermined period of time,
wherein storing the real time term is preceded by a preprocessing step selected from the group consisting of:
adding control data to the information packet;
filtering the information packet;
adding control information to the filtered information packet;
extracting the real time term from the filtered information packet;
filtering the real time term to generate real time terms; and
storing the real time term in a storage unit.

56. The method of claim 55 wherein the control data comprises at least one parameter selected from the group consisting of: (i) information packet identification; (ii) information source identification, (iii) time of arrival, (iv) alert identification; and (v) query identification.

57. The method of claim 55 wherein the real time term is extracted out of the filtered information packet by parsing and stemming a plurality of information packets; and
wherein filtering further comprises a step selected from the group consisting of: (a) discarding a term constructed of a one-letter word; (b) discarding a term constructed of a frequently used word; (c) discarding a term constructed of a stop-word; and (d) discarding a term constructed of a predefined word.

58. The method of claim 55 wherein a reception of the information packet is followed by the steps of:
storing the information packet with an associated packet identifier in the storage unit;
storing a real time term information representative of a reception of the real time term in the storage unit; and
linking the stored information packet and the real time term information.

59. The method of claim 58 further comprising a deletion of an information packet followed by deleting the linked real time term information.

60. The method of claim 59 wherein the information packet is stored in a messages hash, and the linked real time term information is stored in a terms hash.

61. The method of claim 60 wherein the real time term information comprises at least one information field selected from the group consisting of:
- a last modification time field, to indicate a most recent time of reception of the real time term during a predetermined period of time;
- a number of channels containing term, to indicate a number of information sources that provided the real time term during a predetermined period of time;
- a total instances field, to indicate a total amount of receptions of the real time term during a predetermined period of time; and
- a terms inverted entries map, comprising a plurality of terms inverted file entries, each entry holds information representative of a reception of the real time term from a single information source during a predetermined period of time.

62. The method of claim 61 wherein each inverted file entry comprises at least one field selected from the group consisting of:
- a channel identifier, to identify the information source that provided the real time term during a predetermined period of time;
- instances number, to indicate a total amount of receptions of the real time term from an information source during a predetermined period of time; and
- time of last appearance, to indicate a most recent time of reception of the real time term from an information source during a predetermined period of time.

63. The method of claim 62 wherein the information packet is further associated to a message terms key map, comprising a plurality of message characteristic entries, each message characteristic entry associated to a real time term extracted from the information packet, said message characteristic entry comprising at least one field selected from the group consisting of:
- a terms inverted file, to point to the term extracted information;
- an instance number, to indicate a number of times said real time term appeared in the information packet; and
- an inverted file entry, to indicate to a terms inverted file entry.

64. The method of claim 46 further comprising compensating for time differences resulting from a reception of an information stream from a distinct geographical location.

65. The method of claim 46 further comprising compensating for time differences resulting from a reception of an information stream relating to an event that occurs at a distinct geographical location.

66. The method of claim 46 wherein the current reception pattern reflects the reception of the keyword during a test period.

67. The method of claim 46 wherein the current reception pattern reflects the reception of the keyword during at least two test periods.

68. The method of claim 67 wherein the at least two test periods at least partially overlap.

69. The method of claim 67 wherein each of the at least two test periods is characterized by a corresponding current reception pattern.

70. The method of claim 69 wherein determining a relevancy of the keyword comprises comparisons between each corresponding current reception pattern and the reference reception pattern.

71. The method of claim 70 wherein determination of relevancy is responsive to a combination of at least one comparison.

72. The method of claim 67 wherein the reference reception pattern reflects the reception of the keyword during a time period that is much longer than each of the test periods.

73. The method of claim 72 wherein the relevancy is defined by a relevancy level threshold.

74. The method of claim 46 wherein determining the relevancy of the keyword comprises attaching a relevancy level to the keyword.

75. The method of claim 46 wherein the current flow pattern is responsive to at least one weight factor associated to at least one source of received information stream.

76. In a computing environment running on a computer platform utilized as a central server system, a method of calculating the relevancy of a keyword is operating to allow users of client systems connectable thereto to receive indications about the relevancy of the keyword in response to the reception of a real time term by the central server system, the method comprising:
providing a relevancy determination unit comprising:
- a first interface adapted to receive and receives information relating to a reception of a keyword,
- a processor adapted to calculate and calculates a current reception pattern and a previous reception pattern in response to the reception of information relating to the reception of the keyword and to attach and attaches a relevancy level to the keyword, wherein the relevancy level is defined by a relevancy level threshold, and
- a storage unit, coupled to the first interface and the processor, adapted to store and stores the current reception pattern, the previous reception pattern and information relating to the reception of the keyword, wherein the relevancy determination unit is adapted to determine and determines the relevancy of the keyword; and utilizing said relevancy determination unit to:
- determine the keyword,
- extract a real time term from a currently received information stream andlor information packet,
- update the current reception pattern of the keyword in response to a comparison between the extracted real time term and the keyword, and
- determine a relevancy of the keyword in response to a comparison between the current reception pattern and a reference reception pattern.

77. The method of claim 76 wherein the keyword is extracted from a client query.

78. The method of claim 76 wherein the keyword is extracted from an alert criterion of a client.

79. The method of claim 76 further comprising updating at least one client as to the relevancy of the keyword.

80. The method of claim 76 further comprising estimating a flow pattern of the received information stream to generate an estimated flow pattern.

81. The method of claim 80 wherein the current reception pattern of the keyword is further responsive to the estimated flow pattern of the received information stream.

82. The method of claim 80 wherein estimating the flow pattern comprises monitoring the reception of a flow keyword.

83. The method of claim 82 wherein the flow keyword comprises a commonly used word.

84. The method of claim 76 wherein the information stream or the information packet comprises content selected from the group consisting of: text, audio, video, multimedia, and executable code streaming media.

85. The method of claim 76 further comprising compensating for time differences resulting from a reception of an information stream from a distinct geographical location.

86. The method of claim 76 further comprising compensating for time differences resulting from a reception of information stream relating to an event that occurs at a distinct geographical location.

87. The method of claim 76 wherein the current reception pattern reflects the reception of the keyword during a test period.

88. The method of claim 76 wherein the current reception pattern reflects the reception of the keyword during at least two test periods.

89. The method of claim 88 wherein the at least two test periods at least partially overlap.

90. The method of claim 89 wherein each of the at least two test periods is characterized by a corresponding current reception pattern.

91. The method of claim 90 wherein determining the relevancy of the keyword comprises comparisons between each corresponding current reception patterns and between the reference reception pattern.

92. The method of claim 91 wherein the determination of relevancy is responsive to a combination of at least one comparison.

93. The method of claim 88 wherein the reference reception pattern reflects the reception of the keyword during a time period that is much longer than each of the test periods.

94. The method of claim 76 wherein determining the relevancy of the keyword comprises attaching a relevancy level to the keyword.

95. The method of claim 94 wherein the relevancy level is defined by a relevancy level thresholds.

96. The method of claim 76 wherein the current flow pattern is responsive to at least one weight factor associated to at least one source of received information stream.

* * * * *